(12) United States Patent
Kazmi et al.

(10) Patent No.: US 11,405,886 B2
(45) Date of Patent: *Aug. 2, 2022

(54) TELECOMMUNICATIONS METHOD AND APPARATUS FOR FACILITATING POSITIONING MEASUREMENTS

(71) Applicant: Optis Wireless Technology, LLC, Plano, TX (US)

(72) Inventors: Muhammad Kazmi, Bromma (SE); Bengt Lindoff, Bjarred (SE); Walter Müller, Upplands Vasby (SE)

(73) Assignee: Velos Media, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,480

(22) Filed: Sep. 3, 2020

(65) Prior Publication Data

US 2020/0404613 A1 Dec. 24, 2020

Related U.S. Application Data

(63) Continuation of application No. 16/165,639, filed on Oct. 19, 2018, now Pat. No. 10,798,671, which is a
(Continued)

(51) Int. Cl.
*H04W 64/00* (2009.01)
*H04W 48/04* (2009.01)
(Continued)

(52) U.S. Cl.
CPC .......... *H04W 64/003* (2013.01); *H04B 17/20* (2015.01); *H04W 24/02* (2013.01);
(Continued)

(58) Field of Classification Search
None
See application file for complete search history.

(56) References Cited

U.S. PATENT DOCUMENTS 8,126,464 B2  2/2012  Aoyama
8,462,736 B2  6/2013  Kazmi et al.
(Continued)

FOREIGN PATENT DOCUMENTS

EP    1 463 357 A1    9/2004
JP    2008-000804 A   1/2008
(Continued)

OTHER PUBLICATIONS

Nokia, "Measurements in E-UTRAN during DRX"; 3GPP TSG-RAN WG2 Meeting #63, R2-084488; Jeju, Korea; Aug. 18-22, 2008.
(Continued)

*Primary Examiner* — Eunsook Choi
(74) *Attorney, Agent, or Firm* — Nixon & Vanderhye P.C.

(57) ABSTRACT

A wireless terminal (30) capable of operating in a discontinuous mode comprising and method for operating such wireless terminal (30) facilitate measurements pertaining to position of the wireless terminal (30). The method includes receiving a message from the radio access network (20). The measurement request message is configured to indicate that measurements are to be performed by the wireless terminal on downlink signals transmitted by the base station or by the base station on downlink signals transmitted by the base station. The method further comprises, as a result of or after receiving the message, changing operation of the wireless terminal (30) from a discontinuous mode to a modified mode to facilitate performance of the measurements. Relative to the discontinuous mode at least one of following are shortened or eliminated in the modified mode: (i) the non-reception periods, and (ii) the non-transmission periods. "Changing from a discontinuous mode . . . to a modified mode" includes one or more of: (1) changing mode of the wireless terminal (e.g., changing from a discontinuous mode
(Continued)

3-1
RECEIVING A MESSAGE FROM THE RADIO ACCESS NETWORK 3-2
CHANGING OPERATION OF THE WIRELESS TERMINAL FROM A DISCONTINUOUS MODE TO A MODIFIED MODE

[such as discontinuous reception (DRX) or discontinuous transmission (DTX)] to a continuous transmission mode); (2) changing from the discontinuous mode (a first discontinuous mode) to a modified discontinuous mode (a second discontinuous mode).

16 Claims, 12 Drawing Sheets

Related U.S. Application Data continuation of application No. 15/587,552, filed on May 5, 2017, now Pat. No. 10,149,273, which is a continuation of application No. 14/830,712, filed on Aug. 19, 2015, now Pat. No. 9,681,414, which is a continuation of application No. 13/898,841, filed on May 21, 2013, now Pat. No. 9,148,799, which is a continuation of application No. 12/488,303, filed on Jun. 19, 2009, now Pat. No. 8,462,736.

(51) Int. Cl.
| | | |
|---|---|---|
| *H04B 17/20* | (2015.01) | |
| *H04W 76/28* | (2018.01) | |
| *H04W 24/02* | (2009.01) | |
| *H04W 76/27* | (2018.01) | |
| *H04W 88/02* | (2009.01) | |
| *H04W 88/08* | (2009.01) | |
| *H04W 76/20* | (2018.01) | |

(52) U.S. Cl.
CPC ........... *H04W 48/04* (2013.01); *H04W 64/00* (2013.01); *H04W 76/27* (2018.02); *H04W 76/28* (2018.02); *H04W 76/20* (2018.02); *H04W 88/02* (2013.01); *H04W 88/08* (2013.01)

(56) References Cited

U.S. PATENT DOCUMENTS

| | | | |
|---|---|---|---|
| 9,148,799 B2 | 9/2015 | Kazmi et al. | |
| 9,681,414 B2 | 6/2017 | Kazmi et al. | |
| 10,149,273 B2 | 12/2018 | Kazmi et al. | |
| 10,484,946 B2 * | 11/2019 | Kim | H04B 17/309 |
| 2005/0215230 A1 | 9/2005 | Cheng | |
| 2007/0133479 A1 | 6/2007 | Montojo et al. | |
| 2007/0224992 A1 | 9/2007 | Dalsgaard | |
| 2008/0132225 A1 | 6/2008 | Ranta et al. | |
| 2008/0159183 A1 | 7/2008 | Lindoff et al. | |
| 2008/0180414 A1 | 7/2008 | Fung et al. | |
| 2008/0181127 A1 | 7/2008 | Terry | |
| 2008/0207195 A1 * | 8/2008 | Ranta | H04W 36/00835 455/423 |
| 2008/0232310 A1 | 9/2008 | Xu | |
| 2009/0009056 A1 | 1/2009 | Namba et al. | |
| 2009/0023098 A1 | 1/2009 | Jain et al. | |
| 2009/0092056 A1 | 4/2009 | Kitazoe | |
| 2009/0143018 A1 * | 6/2009 | Anderson | G01S 5/0289 455/67.11 |
| 2009/0180414 A1 | 7/2009 | Maeda et al. | |
| 2009/0285141 A1 | 11/2009 | Cai et al. | |
| 2010/0048209 A1 | 2/2010 | Aoyama | |
| 2010/0061356 A1 | 3/2010 | Qvarfordt | |
| 2010/0113055 A1 | 5/2010 | Iwamura et al. | |
| 2010/0113063 A1 | 5/2010 | Han et al. | |
| 2010/0142485 A1 | 6/2010 | Lee et al. | |
| 2010/0202382 A1 | 8/2010 | Park | |
| 2010/0273504 A1 | 10/2010 | Bull et al. | |
| 2010/0278143 A1 | 10/2010 | Chun | |
| 2019/0059069 A1 | 2/2019 | Kazmi et al. | |

FOREIGN PATENT DOCUMENTS

| | | |
|---|---|---|
| WO | 98/48293 A2 | 10/1998 |
| WO | 2007/148175 A1 | 12/2007 |
| WO | 2008/036673 A2 | 3/2008 |
| WO | 2008/126380 A1 | 10/2008 |
| WO | 2009/022860 A1 | 2/2009 |

OTHER PUBLICATIONS

JP Office Action dated Oct. 4, 2019 in JP application 2018-208337.
"Evaluation of the inclusion of Pattern Matching Technology in the UTRAN," TSG-RAN #38 Meeting, RP-070926, Cancun, Mexico, Nov. 26-30, 2007, 3 pages.
"LTE; Evolved Universal Terrestrial Radio Access (E-UTRA); Physical layer—Measurements (3GPP TS 36.214 version 8.6.0 Release 8)," ETSI TS 136 214 V8.6.0, Apr. 2009, 14 pages.
"Network-Based Positioning Support for L TE," 3GPP TSG RAN#43, RP-090354, Biarritz, France, Mar. 3-6, 2009, 5 Pages.
"Positioning Support for L TE," #GPP TSG RAN#42, RP-080995, Athens, Greece, Dec. 2-5, 2008, 167 pages.
"Universal Mobile Telecommunications System (UMTS); Physical layer; Measurements (FDD) (3GPP TS 25.215 version 8.1.0 Release 8)," ETSI TS 125 215 V8.1.0, Oct. 2008, 25 pages.
"Universal Mobile Telecommunications System (UMTS); Physical layer; Measurements (TDD) (3GPP TS 25.225 version 8.0.0 Release 8)," ETSI TS 125 225 V8.0.0, Oct. 2008, 30 pages.
Canadian Office Action received in Canadian Patent Application No. 2,765,671, dated Nov. 13, 2015, 4 pages.
Notice of Acceptance issued by the Australian Government for Application No. 2009348012, dated Nov. 17, 2014, 2 pages.
International Search Report and Written received in corresponding Patent Cooperation Treaty Application No. PCT/SE2009/050789, dated Mar. 2, 2010, 10 pages.
Japanese Office Action received in Japanese Patent Application No. 2012-516028, dated Jun. 14, 2013, 3 pages.
Australian Examination Report dated Jan. 18, 2017 in corresponding AU Application No. 2016201121, 2 pages.
EP Application No. 14186216.9, Search Report, dated Feb. 5, 2015.
Canadian Notice of Allowance dated May 12, 2017 in corresponding CA Application No. 2765671 (1 page).
Japanese Office Action dated Jun. 5, 2017 in corresponding JP Application No. 2016-075413.

* cited by examiner

TELECOMMUNICATIONS METHOD AND APPARATUS FOR FACILITATING POSITIONING MEASUREMENTS

RELATED APPLICATIONS

This application is a continuation application of U.S. patent application Ser. No. 16/165,639 filed Oct. 19, 2018 (pending), which is a continuation of U.S. patent application Ser. No. 15/587,552 filed May 5, 2017 (U.S. Pat. No. 10,149,273), which is a continuation of U.S. patent application Ser. No. 14/830,712 filed Aug. 19, 2015 (U.S. Pat. No. 9,681,414), which is a continuation of U.S. patent application Ser. No. 13/898,841 filed May 21, 2013 (U.S. Pat. No. 9,148,799), which is a continuation of U.S. patent application Ser. No. 12/488,303 filed Jun. 19, 2009 (U.S. Pat. No. 8,462,736), the entire contents of each of which is hereby incorporated herein.

TECHNICAL FIELD

This invention pertains to telecommunications, and particularly to method and apparatus for performing measurements, particularly when a wireless terminal is or has been operating in a discontinuous reception (DRX) and/or a discontinuous transmission (DTX) mode.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB", "B node", or (in LTE) eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of radio access networks, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). An entity known as the Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3rd Generation Partnership Project (3GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes. The evolved UTRAN (E-UTRAN) comprises evolved base station nodes, e.g., evolved NodeBs or eNBs, providing evolved UTRA user-plane and control-plane protocol terminations toward the wireless terminal.

In LTE as in other radio access technologies, it is advantageous for the network to know with reasonable accuracy the geographical position of a wireless terminal (UE). In fact, some countries or jurisdictions mandate that the network be able to locate the UE within a prescribed distance range (e.g., a few tens of meters) and within a stipulated time duration. This requirement is often imposed for facilitating services to UE, such as emergency services to a person operating the UE, or for security management reasons.

Knowledge of the UE's geographical whereabouts typically comes from the UE determining its own geographical position and reporting that geographical position to the network, as well as to the person operating the UE. This capability for the person operating the UE to know his/her location can be of considerable value to the UE operator, and indeed subscriptions to such location-reporting service can be a source of revenue for a network operator.

The Global Navigation Satellite System (GNSS) is the standard generic term for satellite navigation systems that enable subscribers such as UE operators to locate their position and to acquire other relevant navigational information. The global positioning system (GPS) and the European Galileo positioning system are well known examples of GNSS.

Not only Global Navigation Satellite System (GNSS) but also non-GNSS positioning methods have been employed for determining UE position. According to one proposal, in some contexts a GNSS based-positioning method may be employed as a primary positioning technique, while a non-GNSS positioning method may be employed as a secondary or backup positioning technique. See, in this regard, RP-080995, Work Item, "Positioning Support for LTE", Qualcomm (Rapporteur), which is incorporated herein by reference. Other UE positioning techniques are described, e.g., in the following: (1) RP-070926, Study Item, "Evaluation of the inclusion of Pattern Matching Technology in the UTRAN", Polaris Wireless (Rapporteur); and (2) RP-090354, Work Item, "Networl2-Based Positioning Support for LTE", True Position (Rapporteur), both of which are incorporated herein by reference in their entirety.

The non-GNSS positioning methods are often also referred to as terrestrial positioning methods. These terrestrial positioning methods usually determine UE position on the basis of signals measured by the UE and/or radio network nodes such as base station. Examples of such signals and methods include cell identity based methods; networl2-based methods which detect the uplink time difference of arrival (U-TDOA) of signals at different base stations; UE-based methods which observe the time difference of arrival (OTDOA) of signals from three or more cells; and fingerprinting or pattern matching positioning methods.

Some of these terrestrial positioning methods such as cell ID based and pattern matching positioning technology make use of normal UE neighbor cell measurements such as the detected cell identity, received signal strength, path loss etc. On the other hand, certain methods such as U-TDOA and OTDOA require specific measurements. Some of the measurements such as time difference of arrival can also be reused for other purposes such as time alignment at handover, support for cell synchronization, etc.

In the 3rd Generation Partnership Project (3GPP), a layer 3 protocol known as the Radio Resource Control (RRC) layer defines various RRC states to describe the usage of radio resources for the UE. There is a difference in the number of states in UTRAN on the one hand, and LTE on the other hand.

The 3rd Generation Partnership Project (3GPP) also supports a feature known as discontinuous reception (DRX). Discontinuous reception (DRX) enables a UE to save power by turning off some or all of its radio circuitry when not needed, thereby increasing battery lifetime of the UE. Discontinuous reception (DRX) is described and utilized in another perspective in U.S. patent application Ser. No. 12/475,953, filed Jun. 1, 2009, entitled "USING MOBILITY STATISTICS TO ENCHANCE TELECOMMUNICATIONS HANDOVER", which is incorporated herein by reference in its entirety.

In UTRAN there are several RRC states: Idle state; CELL_PCH state; URA_PCH state; CELL_FACH state; and CELL_DCH state. In E-UTRAN in idle state the UE is known on a tracking area level, which comprises of multiple set of cells (e.g. 100-300 cells). Similarly in the CELL_DCH state the UE uses dedicated radio resources that are not shared with other UEs; the UE is known on a cell level according to its current active set; and, the UE can use dedicated transport channels, downlink and uplink shared transport channels, or a combination of transport channels. In the UTRAN CELL_FACH state no dedicated physical channel is assigned to the UE; the UE continuously monitors a FACH channel in the downlink; and, the UE is assigned a default common or shared transport channel in the uplink (e.g., RACH). In the UTRAN CELL_PCH or URA_PCH state no dedicated physical channels is assigned to the UE; no uplink activity is possible; and, the UE receives paging or broadcasting information from the UTRAN. Discontinuous reception (DRX) is now used in all these UTRAN RCC states according to 3GPP release 7 and beyond. But for the CELL_FACH and CEL_DCH states the allowed DRX cycles are much shorter. Specifically, for CELL_DCH max DRX cycle=40 ms.

For LTE there are only two RRC states: Idle state and Connected state. DRX is used in both LTE states, with the DRX cycles in both states ranging from 10 ms to 2.56 sec.

Although the ensuing discussion and description focus on discontinuous reception (DRX) operation in LTE, it should be understand that the discussion and descriptions are not limited to LTE but can apply to other environments including UTRAN.

A DRX "cycle" comprises an "on duration" and a "DRX period". During the "on duration" portion of the cycle the user equipment unit (UE) should monitor a channel known as the Dedicated Physical Control CHannel (PDCCH) for scheduling assignments in RRC connected state. In LTE the paging is also mapped on PDCCH. Therefore UE in idle state also monitors PDCCH for the reception of paging. During the "DRX period" the UE can skip reception of downlink channels for battery saving purposes. Thus DRX has a tradeoff between battery saving and latency: on the one hand, a long DRX period is beneficial for lengthening the battery life of the UE; on the other hand, a shorter DRX period is better for faster response when data transfer is resumed.

In general the DRX function is configured and controlled by the network. The UE behavior is based on a set of rules that define when the UE must monitor the Dedicated Physical Control CHannel (PDCCH) for scheduling assignments. When the UE does not have an established radio-resource control (RRC) connection, i.e., when no radio bearers are configured for radio transmission involving the UE, the UE is generally "asleep" abut wakes up and monitors the paging every DRX cycle.

On the other hand, when the UE has an RRC connection and the DRX function is operative (e.g., RRC connected state in LTE), the DRX function is characterized by the aforementioned DRX cycle, the aforementioned on-duration period, and an inactivity timer. The UE wakes up and monitors the PDCCH at the beginning of every DRX cycle for the entire on duration period. When a scheduling message is received during an "on duration", the UE starts the inactivity timer and monitors the PDCCH in every subframe while the inactivity timer is running. During this period, the UE can be regarded as being in a reception mode. Whenever a scheduling message is received while the inactivity timer is running, the UE restarts the inactivity timer. When the inactivity timer expires the UE moves back into another DRX cycle. If no scheduling assignment is received, the UE falls asleep again.

Thus, in E-UTRAN or LTE the DRX feature is used in both idle and RRC connected modes. The aforementioned positioning measurements are typically done in connected mode. Furthermore in E-UTRAN, there can be a wide range of DRX cycles (e.g., cycle lengths) for use in the RRC connected mode as allowed by the network. For example, the DRX (i.e., the time length of the DRX cycle) can vary between 10 ms to 2.56 seconds. With the increase in the DRX cycle, there is more time between measurements, and thus the measurement performance of measurement quantities can deteriorate since the UE may only sparsely (e.g., less frequently) measure on signals received from the cells. When the UE is in the DRX state the measurement period can also be set to be longer and the length of the measurement period can vary with the DRX cycle.

Measurement period is a concept well known in telecommunications, e.g. UTRAN and E-UTRAN. As illustrated in FIG. 16, one measurement period requires comprises several samples (e.g. 4-5 samples) from each of the cells being samples. The number of samples can vary, e.g., can be implementation-specific. FIG. 16 illustrates a situation in which there are (by way of example) four cells whose signals are measured, and four samplings of each cell. In a non-DRX mode the measurement period is standardized to be 200 milliseconds. The samplings for the cells can be averaged over the measurement period.

Typically the measurement period of a measurement quantity is K times the DRX cycle, e.g. 5 times the DRX. As an example for DRX cycle of 2.56 seconds the measurement period of reference signal received power (RSRP), which is LTE measurement quantity, is approximately 10.28 seconds. During a single measurement period the wireless terminal (UE) is also capable of performing a particular type of measurement (such as RSRP) from certain number of cells, e.g. 6 or 8 cells including the serving cell. The measurement periods of all standardized measurement quantities for the continuous reception (non DRX case) and for all allowed DRX cycles are pre-defined in the 3GPP standard. Similarly the number of cells from which the UE is required to perform certain measurement quantity over the measurement period is also specified in the standard.

So if the measurement period of the positioning measurement is also extended due to DRX, then the measurement reporting delay will increase, and thus the response time in determining the wireless terminal (UE) positioning will be longer. These phenomena can negatively impact accuracy of a determination of wireless terminal (UE) position.

The accuracy of UE positioning determination can not only be affected by discontinuous reception (DRX), but by discontinuous transmission (DTX) as well. That is, discontinuous transmission (DTX) such as discontinuous power control and use of idle gaps for measurements, can also affect the positioning performance. Discontinuous transmission (DTX) is characterized by periodic pattern of activity or transmission followed by relatively longer inactivity or idle periods.

In case of uplink discontinuous transmission (DTX) the base station will less frequently (e.g., sparsely) receive signals from the UE, and hence would have less opportunity for performing measurements. A longer discontinuous transmission (DTX) will lead to longer measurement period and thus longer response time in determining the UE position. For instance, a round trip time (RTT) measurement done at the base station for network based positioning will be delayed when discontinuous transmission (DTX) is used.

In UTRAN, discontinuous transmission (DTX) is characterized by discontinuous power control channel (DPCCH) and is used to reduce the interference and UE power. Similarly other idle gaps such as compressed mode gaps and measurement gaps are used in UTRAN and E-UTRAN respectively.

Positioning measurements are typically performed in RRC connected state. In legacy systems such as UTRAN FDD and TDD, some positioning specific measurements and corresponding procedures exist. In these legacy systems the longest allowed discontinuous reception (DRX) cycle in RRC connected state is limited to 40 ms, and the measurement period of all UE measurements (including positioning measurements) scales with the DRX cycle. For instance, the WCDMA SFN-SFN type 2 positioning related measurement is performed, when UE receiver is active, simultaneously to data reception. This means, depending upon the DRX cycle, the measurement period in DRX is longer than in the non DRX case. However due to shorter DRX (40 ms) in UTRAN CELL_DCH, the impact of the DRX on the positioning performance is not very significant.

In E-UTRAN the DRX cycle in RRC connected state can range up to 2.56 seconds. In DRX state traditionally the measurement period of a measurement quantity is K times DRX cycle, e.g. 10.28 seconds for 2.56 seconds DRX cycle assuming scaling factor of 5. This level of measurement period is very long for the positioning measurement. Therefore scaling of the measurement period when discontinuous reception (DRX) in E-UTRAN is used is not desirable. This is because the extended measurement period will adversely affect the positioning accuracy (i.e. response from UE) and might prevent achieving the positioning accuracy requirements.

The discontinuous transmission (DTX) may also impact the accuracy and response time of positioning performance. Especially uplink measurements such as round trip time (RTT) can be delayed if the UE is operating under longer DTX level or cycle.

SUMMARY

In one of its diverse aspects the technology disclosed herein concerns a method of operating a wireless terminal in communication with a radio access network over a radio interface. The wireless terminal is of a type capable of operating in a discontinuous mode comprising at least one of non-reception periods between reception periods and non-transmission periods between transmission periods. The method comprises receiving a message from the radio access network that indicates that measurements are to be performed by the wireless terminal on downlink signals transmitted by one or more nodes of the radio access network (e.g., on downlink signals transmitted by the base station) or by the radio access network on uplink signals transmitted by the wireless terminal. The method further comprises, as a result of or after receiving the message, changing operation of the wireless terminal from a discontinuous mode to a modified mode to facilitate performance of the measurements. Relative to the discontinuous mode at least one of following are shortened or eliminated in the modified mode: (i) the non-reception periods, and (ii) the non-transmission periods.

In some example embodiments, the measurements are performed by the wireless terminal and the message is a measurement request message which is configured to direct the wireless terminal to perform measurements relative to signals received by the wireless terminal from one or more cells of the radio access network. In other example embodiments the message is transmitted when the radio access network is to perform the measurements and the wireless terminal needs to be in the modified mode during performance of the measurements.

As explained and utilized herein, "changing from a discontinuous mode . . . to a modified mode" comprises one or more of: (1) changing mode of the wireless terminal (e.g., changing from a discontinuous mode [such as discontinuous reception (DRX) or discontinuous transmission (DTX)] to a continuous transmission mode); (2) changing from the discontinuous mode (a first discontinuous mode) to a modified discontinuous mode (a second discontinuous mode). The changing from the (first) discontinuous mode to a modified (second) discontinuous mode can involve changing a parameter or value associated with the discontinuous mode, e.g., changing (e.g., shortening) a parameter or value such as a discontinuous reception (DRX) cycle value or a discontinuous transmission (DTX) level value.

In an example embodiment the discontinuous mode is a discontinuous reception (DRX) mode. In another example embodiment the discontinuous mode is a discontinuous transmission (DTX) mode. In yet another example embodiment the discontinuous mode includes both discontinuous reception (DRX) mode and discontinuous transmission (DTX).

In an example embodiment the modified mode is a continuous mode. In another example embodiment the modified mode comprises a modified discontinuous mode having a modified discontinuous mode parameter, the modified discontinuous mode parameter being indicative of a shorter cycle than a previous discontinuous mode parameter. In this latter embodiment, the act of changing, as a result of receiving the message, can comprise changing from a first discontinuous mode characterized by a first discontinuous mode value to a second discontinuous mode characterized by a second discontinuous mode value; and, upon completion of the performance of the measurements; reverting back to the first discontinuous mode. In an example embodiment, the second discontinuous mode value is smaller or shorter than the first discontinuous mode value. In an example implementation, the discontinuous mode is a discontinuous reception (DRX) mode and the first discontinuous mode value and the second discontinuous mode value are differing discontinuous reception (DRX) cycle lengths. In another example implementation, the discontinuous mode is a discontinuous transmission (DTX) mode and the first discontinuous mode value and the second discontinuous mode value are differing discontinuous transmission (DTX) level values.

In an example embodiment the measurements are for determining position of the wireless terminal. In an example implementation, the message is a measurement request message which is configured to direct the wireless terminal to measure time difference of arrival of the signals received by the wireless terminal from plural cells of the radio access network. In another example implementation the measurement request message is configured to direct the wireless terminal to measure reference signal time difference (RSTD) of signals received by the wireless terminal from plural cells of the radio access network. The RSTD measurement can be performed by the wireless terminal on any suitable reference or pilot or any known signals received from plural cells. For instance the reference signals may be common reference signals, which are also used for other measurements, or positioning reference signals, which are primarily transmitted to facilitate positioning measurement.

In an example embodiment, the method further comprises changing from the discontinuous mode in accordance with a mode change timing factor (MCTF) which influences when a mode change occurs from the discontinuous mode to the modified mode. In an example implementation the method further comprises pre-configuring the mode change timing factor (MCTF) at the wireless terminal prior to reception of the message. In another example implementation the method further comprises including the mode change timing factor (MCTF) in the message.

In an example embodiment the method further comprises, upon completion of the performance of the measurements, reverting back to the discontinuous mode from the modified mode after expiration of a post-measurement mode revert timing factor (MRTF) which influences timing of a reversion from the modified mode to the discontinuous mode.

In an example embodiment, changing from the discontinuous mode to the modified mode comprises disabling one or both of discontinuous reception (DRX) and discontinuous transmission (DTX).

In another of its aspects the technology disclosed herein concerns another method of operating a wireless terminal in communication with a radio access network over a radio interface. The method comprises receiving a message from the radio access network that indicates that measurements are to be performed by the wireless terminal on downlink signals transmitted by one or more nodes of the radio access network (e.g., on downlink signals transmitted by the base station) or by the radio access network on uplink signals transmitted by the wireless terminal; and, as a result of receiving the message, ignoring or modifying the discontinuous mode while the wireless terminal performs the measurements. In some example embodiments the message is a measurement request message which is configured to direct the wireless terminal to perform measurements on signals received by the wireless terminal from one or more cells of the radio access network.

In another of its aspects the technology disclosed herein concerns another method of operating a wireless terminal in communication with a radio access network over a radio interface. The method comprises receiving a message from the radio access network that indicates that measurements are to be performed by the wireless terminal on downlink signals transmitted by the base station or by the radio access network on uplink signals transmitted by the wireless terminal; and, as a result of receiving the message; providing a shorter or moderate measurement period for the wireless terminal to perform the measurements corresponding to that of a shorter or a moderate DRX cycle. In some example embodiments the message is a measurement request message which is configured to direct the wireless terminal to perform measurements on signals received by the wireless terminal from one or more cells of the radio access network.

In another of its aspects the technology disclosed herein concerns a wireless terminal configured for communication with a radio access network over a radio interface. The wireless terminal is of a type capable of operating in a discontinuous mode comprising at least one of non-reception periods between reception periods and non-transmission periods between transmission periods. The wireless terminal comprises a transceiver and a computer-implemented radio resource control (RRC) unit. The transceiver is configured to receive a message from the radio access network that indicates that measurements are to be performed by the wireless terminal on downlink signals transmitted by the base station or by the radio access network on uplink signals transmitted by the wireless terminal. The radio resource control (RRC) unit is configured, as a result of receiving the message, to change the wireless terminal from the discontinuous mode to a modified mode to facilitate performance of the measurements. The discontinuous mode is configured to comprise at least one of non-reception periods between reception periods and non-transmission periods between transmission periods. Relative to the discontinuous mode the modified mode is configured to shortened or eliminated at least one of following: (i) the non-reception periods, and (ii) the non-transmission periods. In some example embodiments the message is a measurement request message which is configured to direct the wireless terminal to perform measurements relative to the position determination signals, and the transceiver is configured to received position determination signals from one or more cells of the radio access network.

In an example embodiment the discontinuous mode is a discontinuous reception (DRX) mode. In another example embodiment the discontinuous mode is a discontinuous transmission (DTX) mode.

In an example embodiment the modified mode is a continuous mode. In another example embodiment the modified mode comprises a modified discontinuous mode having a modified parameter, the modified parameter being shorter than a previous parameter.

In an example embodiment the radio resource control (RRC) unit is further configured, as a result of receiving the message, to change the operation of the wireless terminal from a first discontinuous mode characterized by a first discontinuous mode value to a second discontinuous mode characterized by a second discontinuous mode value; and, upon completion of the performance of the measurements, to revert back to the first discontinuous mode. In an example implementation, the second discontinuous mode value is smaller or shorter than the first discontinuous mode value. In an example implementation, the discontinuous mode is a discontinuous reception (DRX) mode and the first discontinuous mode value and the second discontinuous mode value are differing discontinuous reception (DRX) cycle lengths. In another example implementation, the discontinuous mode is a discontinuous transmission (DTX) mode and the first discontinuous mode value and the second discontinuous mode value are differing discontinuous transmission (DTX) level values.

In an example embodiment the wireless terminal further comprises a measurement unit configured to perform the measurements for determining position of the wireless terminal. In an example implementation the measurement request message is configured to direct the measurement unit of the wireless terminal to measure time difference of arrival of the signals received by the wireless terminal from plural cells of the radio access network. In another example implementation the measurement request message is configured to direct the measurement unit of the wireless terminal to measure reference signal time difference (RSTD) of signals received by the wireless terminal from plural cells of the radio access network.

In an example embodiment the radio resource control (RRC) unit is configured to change from the discontinuous mode in accordance with a mode change timing factor (MCTF) which influences when a mode change occurs from the discontinuous mode to the modified mode. In an example implementation the mode change timing factor (MCTF) is pre-configured at the wireless terminal prior to reception of the message. In another example implementation the mode change timing factor (MCTF) is included in the message.

In an example embodiment the radio resource control (RRC) unit is further configured, upon completion of the performance of the measurements, to revert back to the discontinuous mode from the modified mode after expiration of a post-measurement mode revert timing factor (MRTF) which influences timing of a reversion from the modified mode to the discontinuous mode.

In an example embodiment the radio resource control (RRC) unit is configured to change from the discontinuous mode to the modified mode by disabling one or both of discontinuous reception (DRX) and discontinuous transmission (DTX).

In another of its aspects the technology disclosed herein concerns a wireless terminal configured to operate in communication with a radio access network over a radio interface. The wireless terminal comprises a transceiver and a computer-implemented radio resource control (RRC) unit. The transceiver is configured to receive a message from the radio access network that indicates that measurements are to be performed by the wireless terminal on downlink signals transmitted by the base station or the radio access network on uplink signals transmitted by the wireless terminal. The radio resource control (RRC) unit of the wireless terminal is configured, as a result of receiving the message, to ignore or modify the discontinuous mode while the wireless terminal while the wireless terminal performs the measurements. In an example embodiment, the message is a measurement request message which is configured to direct the wireless terminal to perform measurements for the position determination signals on signals transmitted from plural cells of the radio access network, and the transceiver is further configured to receive position determination signals from one or more cells of the radio access network.

In another of its aspects the technology disclosed herein concerns a node of a radio access network (RAN) which is configured for operation over a radio interface with a wireless terminal. The node comprises a computer-implemented node radio resource control (RRC) unit and a transceiver. The radio resource control (RRC) unit is configured to prepare a measurement request message for transmission to the wireless terminal. The measurement request message is configured both to direct the wireless terminal to perform measurements for the position determination on signals transmitted from plural cells of the radio access network and to provide the wireless terminal with a parameter to be used by the wireless terminal for facilitating performance of the measurements by the wireless terminal by changing operation of the wireless terminal from a discontinuous mode to a modified mode. The discontinuous mode is configured to comprise at least one of non-reception periods between reception periods and non-transmission periods between transmission periods. Relative to the discontinuous mode the modified mode is configured to shortened or eliminated at least one of following: (i) the non-reception periods, and (ii) the non-transmission periods. The transceiver is configured to transmit the measurement request message to the wireless terminal over the radio interface.

In an example embodiment the discontinuous parameter is for a discontinuous reception (DRX) mode. In another example embodiment the discontinuous parameter is for a discontinuous transmission (DTX) mode. In yet another example embodiment the discontinuous parameter encompasses one or more of the discontinuous reception (DRX) mode the discontinuous transmission (DTX) mode.

In an example embodiment the measurements are for determining position of the wireless terminal.

In an example embodiment the measurement request message is configured to direct the wireless terminal to measure time difference of arrival of the signals received by the wireless terminal from plural cells of the radio access network. In another example embodiment the measurement request message is configured to direct the wireless terminal to measure reference signal time difference (RSTD) of signals received by the wireless terminal from plural cells of the radio access network.

In an example embodiment the discontinuous parameter comprises a pre-change time offset. In another example embodiment the discontinuous parameter comprises a post-measurement mode revert timing factor (MRTF) which influences timing of a reversion from the modified mode to the discontinuous mode.

Thus the technology disclosed herein encompasses defining a rule or set of rules need to facilitate positioning measurements when wireless terminal (UE) is in DTX/DRX modes. Such rules ensure good positioning performance to guarantee that various regulatory requirements and emergency call service targets are met.

Therefore, suitable procedures and methods and apparatus are provided for performing positioning related measurements such as observed time difference of arrival in DRX state. The technology disclosed herein discloses method and arrangement for the time difference of signals arrival type of measurements for determining UE positioning in DRX state. The technology disclosed herein also discloses methods for performing positioning measurements in DTX mode. The technology disclosed herein is applicable to other positioning measurements performed by wireless terminal (UE) or by the network node in DRX and/or DTX states. The technology disclosed herein is also applicable for any measurement performed by the wireless terminal (UE) or by the network node in DRX and/or DTX states.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors and/or controllers, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 1:
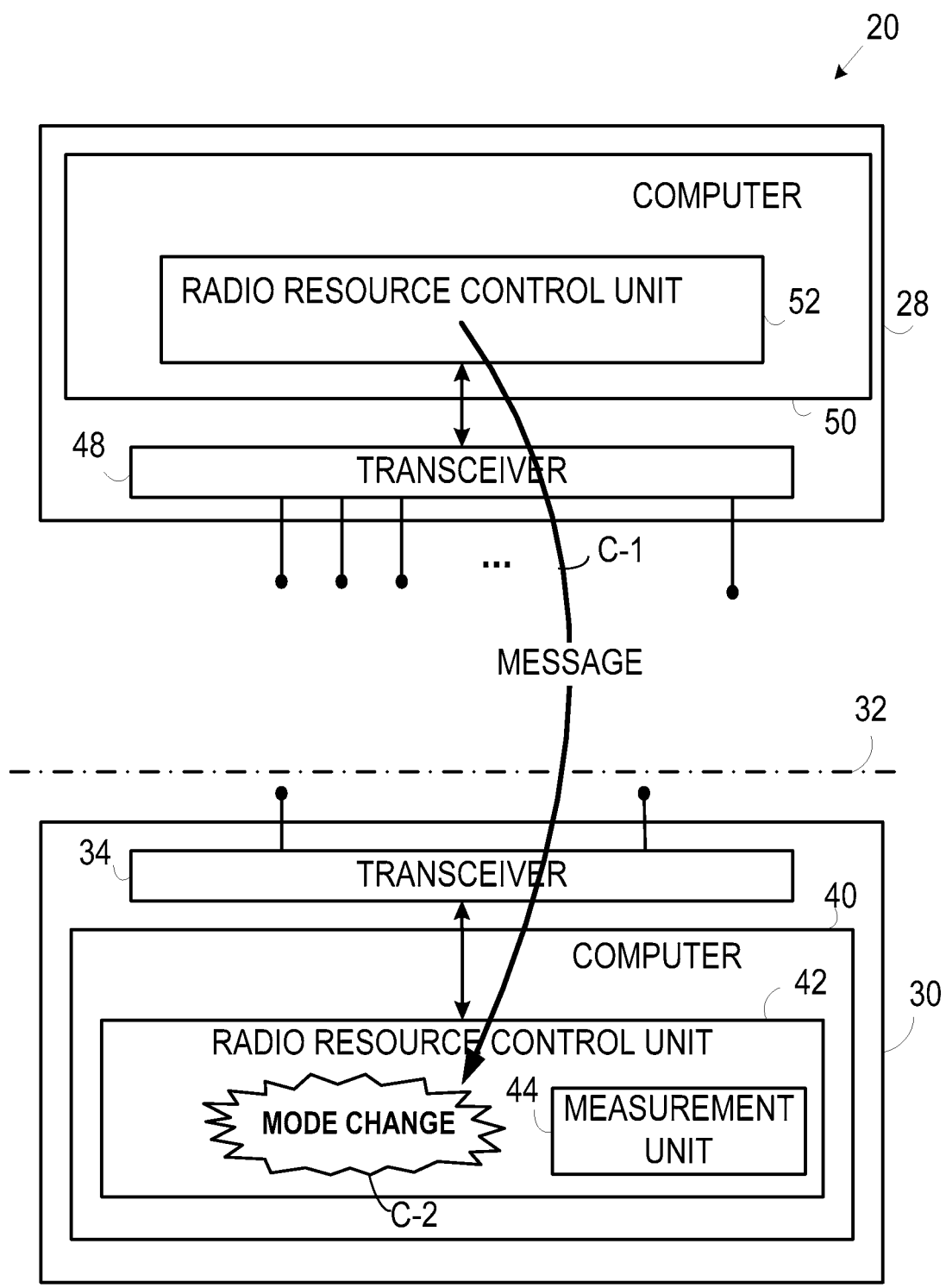
FIG. 1 is schematic diagram of a portion of a radio access network including a representative network node and a representative wireless terminal.

FIG. 1 shows an example communications network 20 such as a radio access network (RAN). The network 20 comprises, among other possible entities, network node 22 which communicates with wireless terminal 30. In some example implementations network node 22 takes the form of a radio network controller node (RNC). In other example embodiments such as LTE implementations the network node 22 can instead take the form of a radio base station or eNodeB.

The wireless terminal 30 can be a mobile station or user equipment unit (UE) such as a mobile telephone ("cellular" telephone) and or a laptop with wireless capability, e.g., mobile termination, and thus can be, for example, portable, pocket, hand-held, computer-included, or car-mounted mobile devices which communicate voice and/or data with radio access network. In various drawings the wireless terminal 30 is illustrated as or referred to as a "UE". The wireless terminal 30 communicates over a radio or air interface 32 with communications network 20. Typically the network node 22 is in communication with many wireless terminals, but for sake of simplicity only one such wireless terminal 30 is shown.

Figure 2:
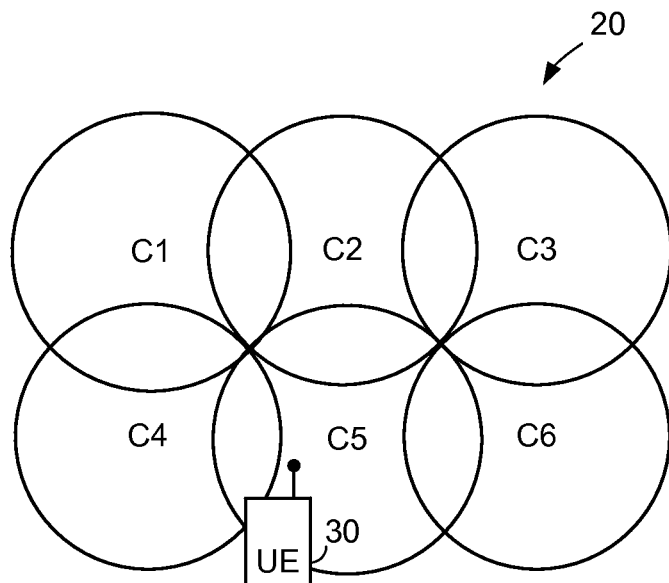
FIG. 2 is a topographical view of an example cell arrangement for a communications network.

FIG. 2 depicts in topographical format portions of a cellular arrangement of communications network 20, showing specifically example cells C1-C6. A base station node is associated with each cell. FIG. 2 further shows a representative wireless terminal 30 being located within cell C5 of communications network 20. In view, e.g., of its CDMA capabilities and handover capabilities, the wireless terminal 30 monitors (e.g., measures) signals associated with each cell, e.g., pilot signals which include an identification of the cell from which they are transmitted.

FIG. 1 shows wireless terminal 30 as comprising, in its most basic form, transceiver 34 and processor or computer 40. The transceiver 34 serves to facilitate one or both of downlink transmissions from communications network 20 to wireless terminal 30 and uplink transmissions from wireless terminal 30 to communications network 20. The transceiver 34 generally comprises antenna(s), amplifiers, and associated hardware elements for transmitting and receiving radio signals over radio interface 32.

The computer 40 serves many purposes, including execution of instructions for enabling operation of wireless terminal 30 in conjunction with its own operation as well as transmission of signals and data over radio interface 32. For illustrating the basic aspect of the technology disclosed herein FIG. 1 shows computer 40 as comprising radio resource control (RRC) unit 42, which in turn comprises measurement unit 44. It should be appreciated that, in other example embodiments, the measurement unit 44 can be located or provided externally to radio resource control (RRC) unit 42. As explained herein, measurement unit 42 serves to perform measurements relative to plural cells of network 20 (see FIG. 2).

The wireless terminals described herein are of a type capable of operating in a discontinuous mode. As used herein "discontinuous mode" comprises or encompasses at least one of non-reception periods between reception periods and non-transmission periods between transmission periods. A discontinuous mode comprising non-reception periods between reception periods is also known as a discontinuous reception (DRX). A discontinuous mode comprising non-transmission periods between transmission periods is also known as a discontinuous transmission (DTX).

FIG. 1 illustrates a non-limiting implementation of network node 28 in a LTE environment in which network node 28 is an eNodeB (e.g., base station node). FIG. 1 further shows network node 28 as comprising node transceiver 48 and node processor or node computer 50. The node transceiver 48 typically comprises plural antenna along with associated electronics such as amplifiers, for example. The node computer 50 comprises node radio resource control (RRC) unit 52.

As used herein, "transceiver" should be understood to encompass, at least in some embodiments, plural transceivers. Moreover, the fact that a transceiver of either the wireless terminal 30 or the network node 28 can be involved in a discontinuous reception (DRX) mode of operation on the downlink does not necessarily mean that the transceiver is also involved in a discontinuous transmission (DTX) mode of operation on the uplink, or vice versa.

Figure 3:
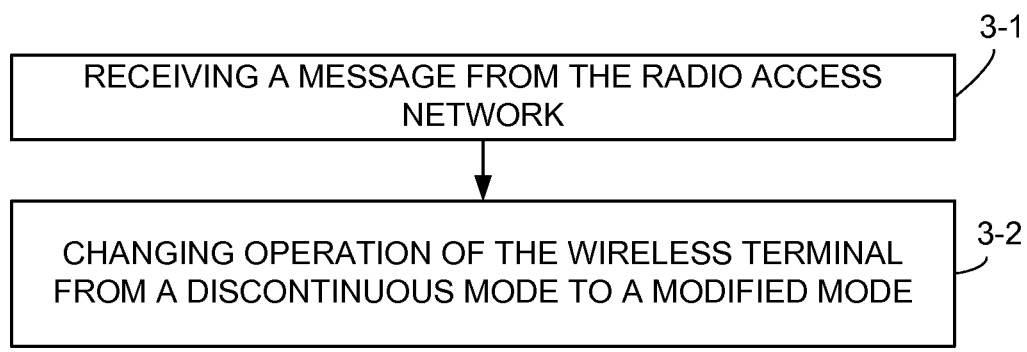
FIG. 3 is a flowchart showing basic, example acts or steps comprising an example embodiment of a method of operating a wireless terminal.

One of the aspects of the technology disclosed herein concerns a method of operating a wireless terminal such as wireless terminal. FIG. 3 shows example representative acts or steps involved in a method according to a first aspect of the technology disclosed herein. Act 3-1 comprises the wireless terminal 30 receiving, through its transceiver 34, a message from the radio access network that indicates that measurements are to be performed by the wireless terminal on downlink signals transmitted by one or more nodes of the radio access network or by the radio access network on uplink signals transmitted by the wireless terminal. By "downlink signals transmitted by one or more nodes of the radio access network" specifically includes but is not limited to downlink signals transmitted by the base station, e.g. the eNodeB.

The method further comprises, as a result of or after receiving the message, the act (act 3-2) of changing an operation mode of the wireless terminal 30, i.e., changing operation of the wireless terminal from a discontinuous mode to a modified mode to facilitate performance of the measurements.

Figure 4:
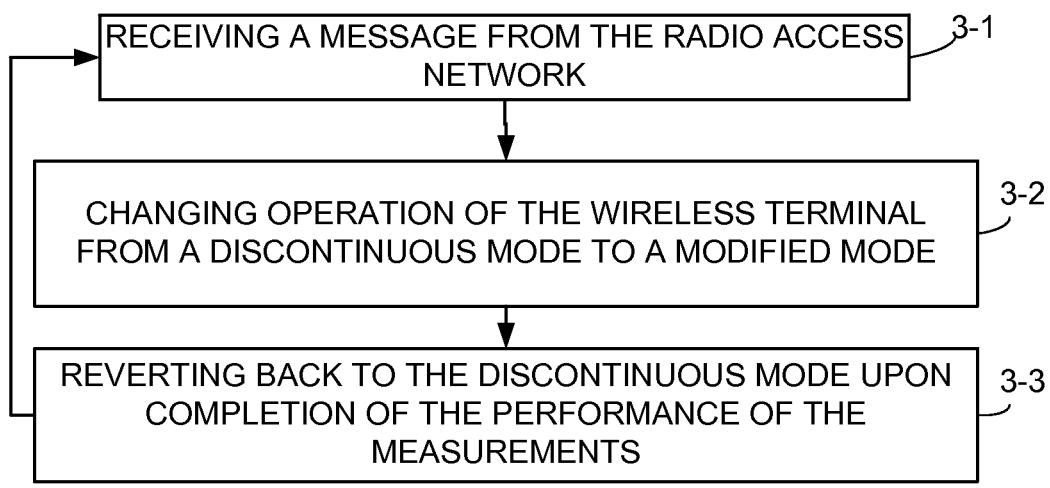
FIG. 4 is a flowchart showing basic, example acts or steps comprising an example embodiment of a method of operating a wireless terminal which includes an act of the wireless terminal reverting back from the modified mode to the discontinuous mode upon completion of the performance of the measurements.

FIG. 4 illustrates a preferred version of the method of FIG. 3 which further includes as act 3-3 the wireless terminal 30 reverting back from the modified mode to the discontinuous mode upon completion of the performance of the measurements. In an example embodiment the reverting act 3-3 can be accomplished by radio resource control (RRC) unit 42 upon receipt of an indication from measurement unit 44 that the measurements of the measurement period have been completed. FIG. 4 also shows that act 3-3 can be followed by another execution of act 3-1, and that acts of FIG. 4 can be executed essentially in looped or repetitive manner as needed.

In several example embodiments described herein the message received from the radio access network as act 2-1 is a measurement request message (MRM) which is configured to direct wireless terminal 30 to perform measurements relative to signals received by the wireless terminal from one or more cells of the radio access network (see FIG. 2). In other embodiments, such as those depicted by FIG. 13 and FIG. 14, the message received as act 2-1 indicates that the radio access network will perform the measurements.

As previously mentioned, a "discontinuous mode" comprises or encompasses at least one of non-reception periods between reception periods and non-transmission periods between transmission periods. For example, a discontinuous mode comprising non-reception periods between reception periods is also known as a discontinuous reception (DRX); a discontinuous mode comprising non-transmission periods between transmission periods is also known as a discontinuous transmission (DTX).

Figure 5:
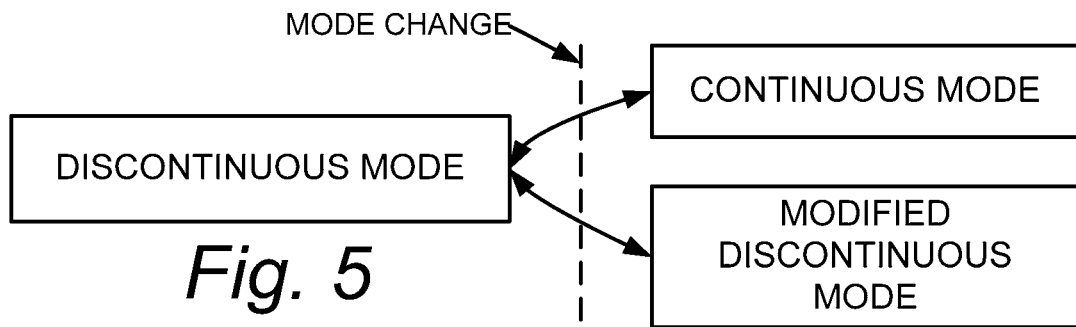
FIG. 5 is a diagrammatic view generically illustrating the concept of changing from a discontinuous mode to a modified mode.

Changing from a discontinuous mode to a modified mode" can comprise several scenarios. A first generic scenario is illustrated in FIG. 5, which generally shows the mode of the wireless terminal changing from a discontinuous mode to a modified mode, with the modified mode comprising either a continuous mode of a modified discontinuous mode. More specific examples of the generic scenario of FIG. 5 are provided in FIG. 5A through FIG. 5C.

Figure 5A:
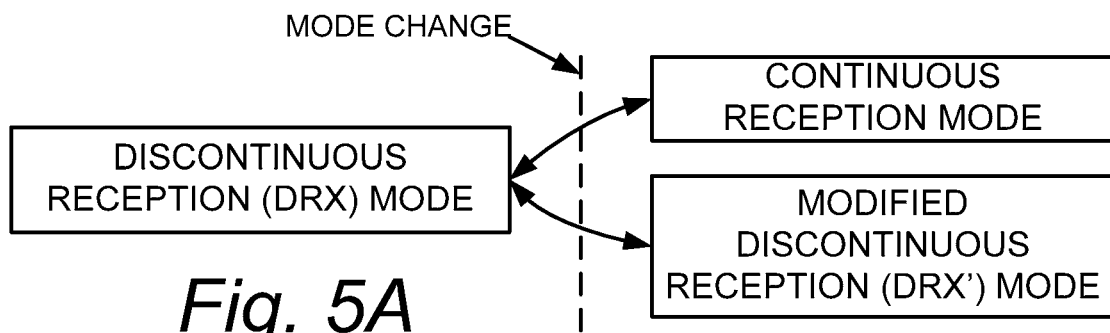
FIG. 5A-FIG. 5C are diagrammatic views showing example specific situation of changing from a discontinuous mode to a modified mode.

FIG. 5A illustrates a situation in which the discontinuous mode is the discontinuous reception (DRX) mode, and wherein upon receipt of the message of act 2-1 from the radio access network the wireless terminal changes operation to either a continuous reception mode or to a modified discontinuous reception (DRX') mode. In the FIG. 5A situation receipt of the message (MRM) does not alter the transmission operation mode of the wireless terminal.

Figure 5B:
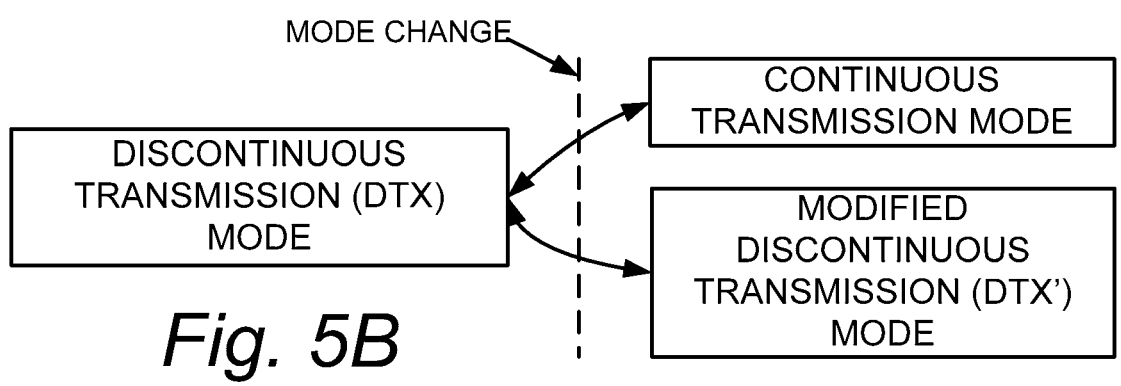

FIG. 5B illustrates a situation in which the discontinuous mode is the discontinuous transmission (DTX) mode, and wherein upon receipt of the message of act 2-1 the wireless terminal changes operation to either a continuous transmission mode or to a modified discontinuous transmission (DTX') mode. In the FIG. 5B situation receipt of the message of act 2-1 does not alter the reception operation mode of the wireless terminal.

Figure 5C:
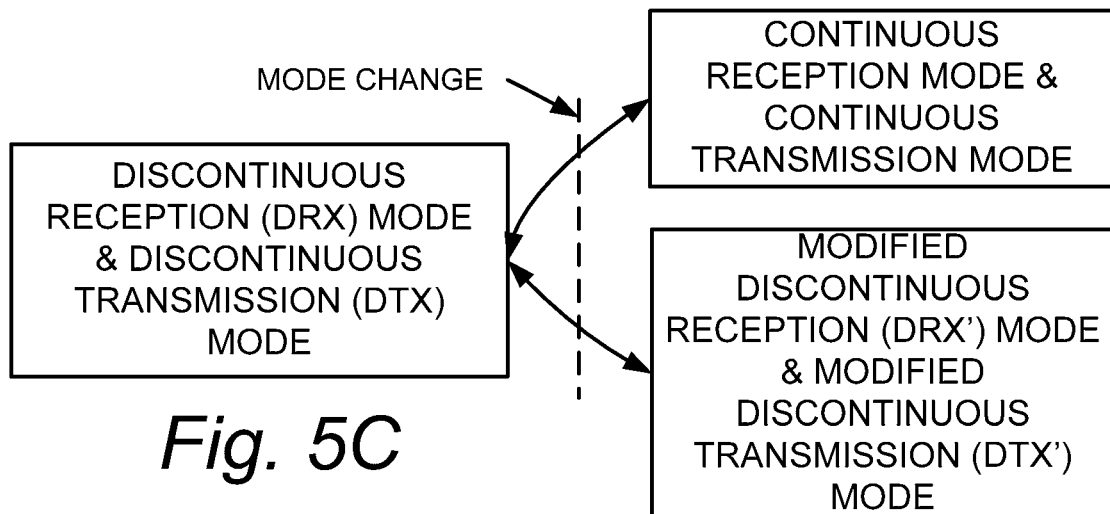

FIG. 5C illustrates a situation in which the discontinuous mode includes both the discontinuous reception (DRX) mode and the discontinuous transmission (DTX) mode. Upon receipt of the message of act 2-1 the wireless terminal changes operation of either to a continuous mode (which includes both continuous reception and continuous transmission) or to a modified mode (which includes both modified discontinuous reception (DRX') and modified discontinuous transmission (DTX').

Thus, as used herein, the expression "changing from a discontinuous mode . . . to a modified mode" comprises one or more of: (1) changing mode of the wireless terminal (e.g., changing from a discontinuous mode [such as discontinuous reception (DRX) or discontinuous transmission (DTX)] to a continuous transmission mode); (2) changing from the discontinuous mode (a first discontinuous mode) to a modified discontinuous mode (a second discontinuous mode).

The changing from the (first) discontinuous mode to a modified (second) discontinuous mode can involve changing a parameter or value associated with the discontinuous mode, e.g., changing (e.g., shortening or diminishing) a parameter or value such as a discontinuous reception (DRX) cycle value or a discontinuous transmission (DTX) level value.

In view of the ability of the wireless terminal 30 to revert back to the discontinuous mode as indicated by act 3-3, the arrows of FIG. 5 and FIG. 5A-FIG. 5C are shown to be double headed. It will also be understood that the broken line referenced as "mode change" in any of FIG. 5 and FIG. 5A-FIG. 5C can encompass either a mode change prompted by receipt of the message of act 2-1 or a reverting mode change which is permitted upon completion of the measurements, e.g., upon end of the measurement period.

Figure 6:
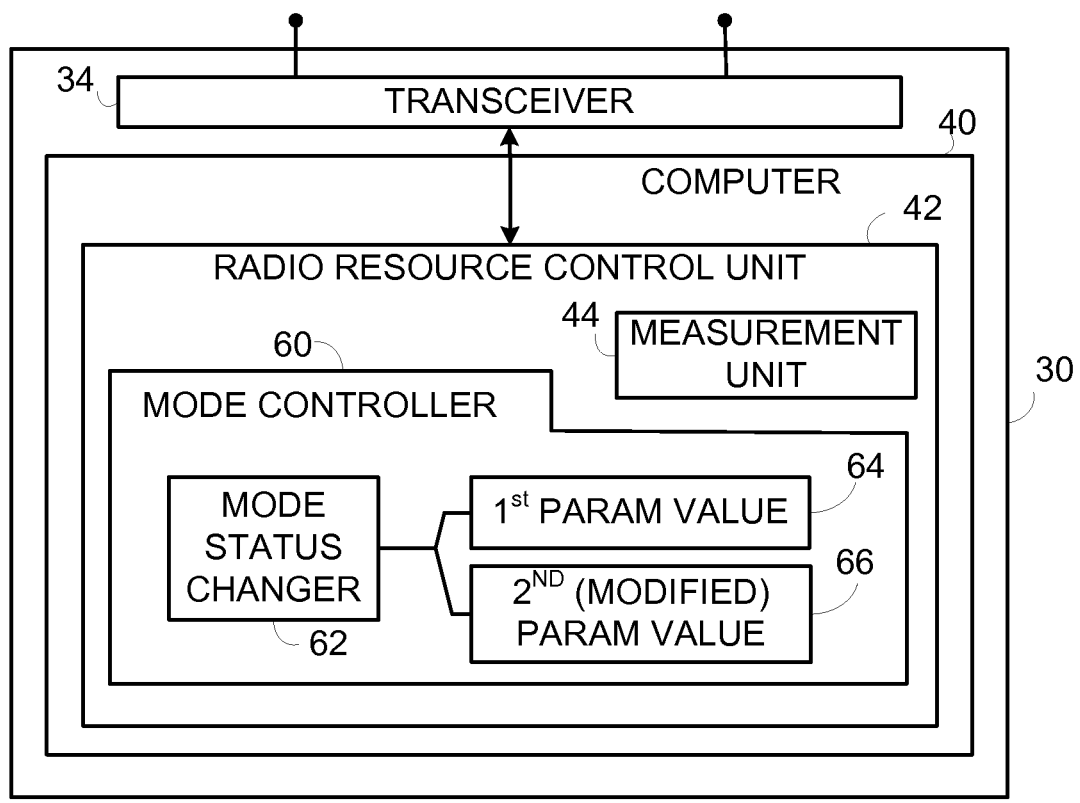
FIG. 6 is schematic diagram of a portion of representative wireless terminal according to an example embodiment.

FIG. 6 shows an example embodiment of wireless terminal 30 wherein radio resource control (RRC) unit 42 comprises mode controller 60. The mode controller 60 includes mode status changer 62 which implements mode changes, such as one or more of the mode changes shown in FIG. 5 or FIG. 5A-FIG. 5C, and keeps track of the current mode of operation of wireless terminal 30.

As mentioned above, the mode change, i.e., "changing from a discontinuous mode . . . to a modified mode" can comprise changing from the discontinuous mode (a first discontinuous mode) to a modified discontinuous mode (a second discontinuous mode). An example way to implement a change from a first discontinuous mode to a second discontinuous mode includes changing a parameter or value associated with the discontinuous mode. For example, a parameter having a first value in the discontinuous mode can be changed to a second value in the modified discontinuous mode. To this end, the mode controller 60 of wireless terminal 30 of FIG. 6 is shown as comprising a register or memory location for storing a discontinuous mode parameter value ($1^{ST}$ parameter value register 64) and register or memory location for storing a modified mode parameter value ($2^{nd}$ parameter value register 66).

From the foregoing it is understood that as a result of receiving the message of act 2-1, in an example embodiment the operation of the wireless terminal can be changed from a first discontinuous mode (characterized by a first discontinuous mode parameter value [which can be stored in $1^{ST}$ parameter value register 64]) to a second discontinuous mode (characterized by a second discontinuous mode value [which can be stored in $2^{nd}$ parameter value register 66]). The second discontinuous mode value is shorter (e.g., of less magnitude) than the first discontinuous mode parameter value.

As one example of the foregoing, in example implementations in which the discontinuous mode is a discontinuous reception (DRX) mode, the first discontinuous mode parameter value and the second discontinuous mode parameter value are differing discontinuous reception (DRX) cycle lengths. The second discontinuous mode parameter value, e.g. the DRX cycle length of the modified (second) discontinuous mode, has a smaller magnitude than the first discontinuous mode parameter value, e.g., the DRX cycle length of the first discontinuous mode.

As another example of the foregoing, in example implementations in which the discontinuous mode is a discontinuous transmission (DTX) mode, the first discontinuous mode parameter value and the second discontinuous mode parameter value are differing discontinuous transmission (DTX) levels. The second discontinuous mode parameter value, e.g. the DTX level of the modified (second) discontinuous mode, has a smaller magnitude than the first discontinuous mode parameter value, e.g., the DTX level of the first discontinuous mode.

Figure 7:
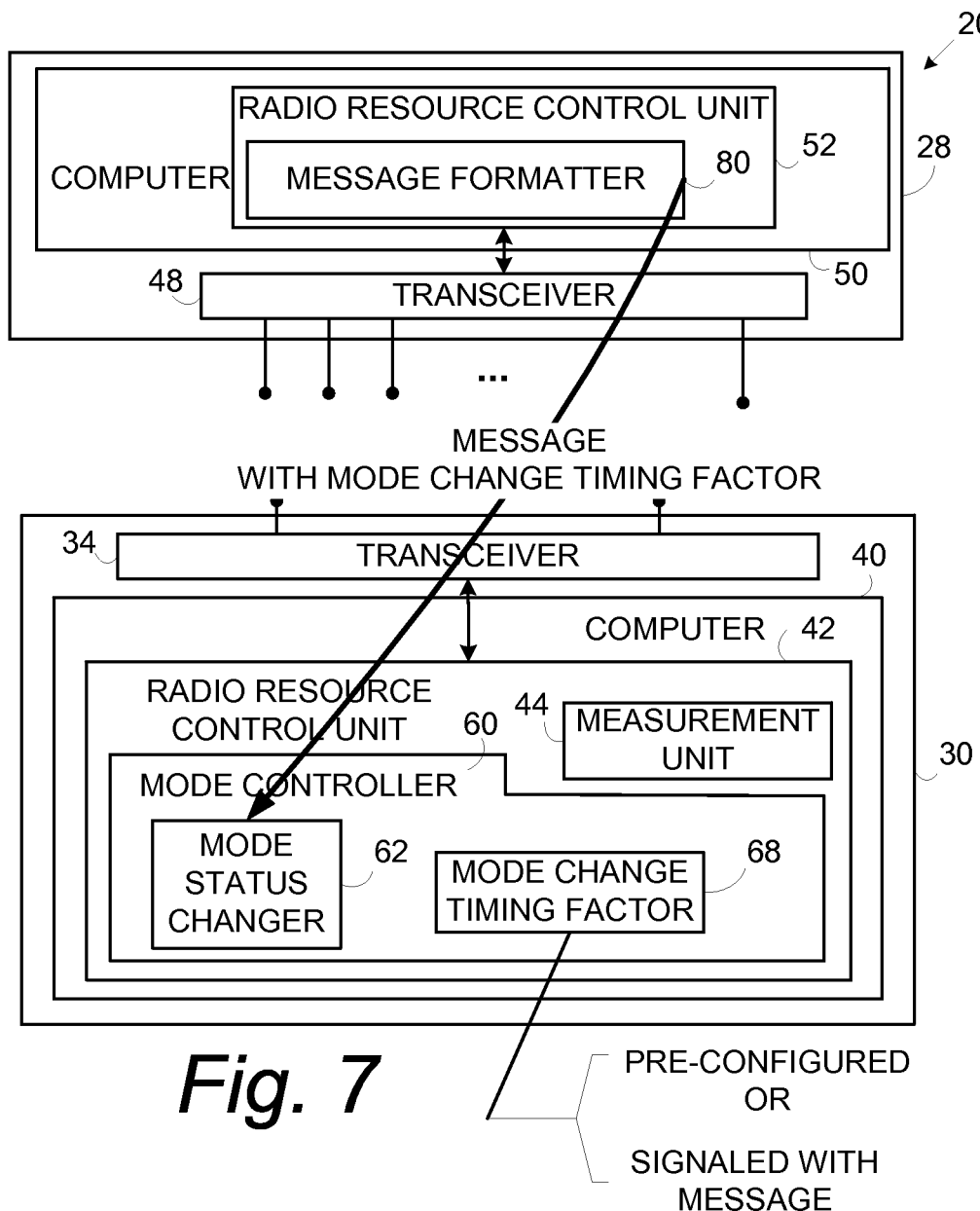
FIG. 7 is schematic diagram of a portion of a radio access network including a representative network node and a representative wireless terminal wherein a mode change from a discontinuous mode to a modified mode occurs in accordance with a mode change timing factor.
Figure 8:
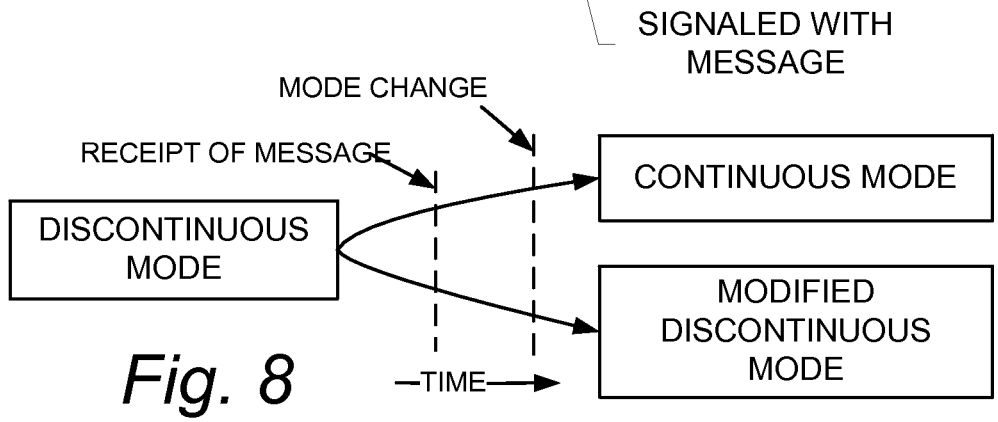
FIG. 8 is a diagrammatic view illustrating a timing sequence of the network of FIG. 7.

FIG. 7 and FIG. 8 illustrate an example embodiment of wireless terminal 30 wherein the radio resource control (RRC) unit 42 is configured to change from the discontinuous mode in accordance with a mode change timing factor (MCTF) which influences when a mode change occurs from the discontinuous mode to the modified mode. FIG. 8 superimposes a time vector on the illustration of the mode change from the discontinuous mode to the modified mode, and shows a relative time positioning of receipt of the message of act 2-1 and the subsequent mode change. Whereas in the previous embodiments the mode change occurs as soon as practicable after receipt of the message of act 2-1, in the FIG. 7 and FIG. 8 embodiment the mode change timing factor (MCTF) essentially serves to delay the mode change past the point of practicable implementation. In some cases the mode change timing factor (MCTF) can be an offset value (e.g., either a time duration or frame) which is required to occur after receipt of the message of act 2-1 before the mode change is to be implemented. In other cases, rather than being a relative offset value, the mode change timing factor (MCTF) can be an indication of a particular (e.g., absolute) frame number of point in time at which the mode change is to occur (the mode change timing factor (MCTF), in such cases pointing to a mode change event which is to occur after receipt of the message of act 2-1.

FIG. 7 serves to illustrate two separate implementations, including a first implementation wherein the mode change timing factor (MCTF) is pre-configured at the wireless terminal prior to reception of the message of act 2-1. To this end FIG. 7 shows radio resource control (RRC) unit 42 and its mode controller 60 as comprising mode change timing factor (MCTF) register or memory location 68 wherein the pre-configured mode change timing factor (MCTF) can be stored. As mentioned, the pre-configuring can occur at any point prior to receipt of the message of act 2-1, e.g., at beginning of a session, through pre-session periodic update or administrative messages from the network, or upon initiation or power up of the wireless terminal 30.

FIG. 7 also shows another example implementation wherein a value for the mode change timing factor (MCTF) is included in the message of act 2-1. This FIG. 7 alternate implementation shows the node radio resource control (RRC) unit 52 of network node 28 as including a message formatter 70. The message formatter 70 of FIG. 7 is configured to include the mode change timing factor (MCTF) in the message of act 2-1. In an example implementation, the message of act 2-1 can take the form of (or be included in) any suitable RRC signaling message. The mode change timing factor (MCTF) can be inserted in any unallocated field or any newly designated field of the measurement request message (MRM), such as a measurement configuration information element, for example.

Figure 9:
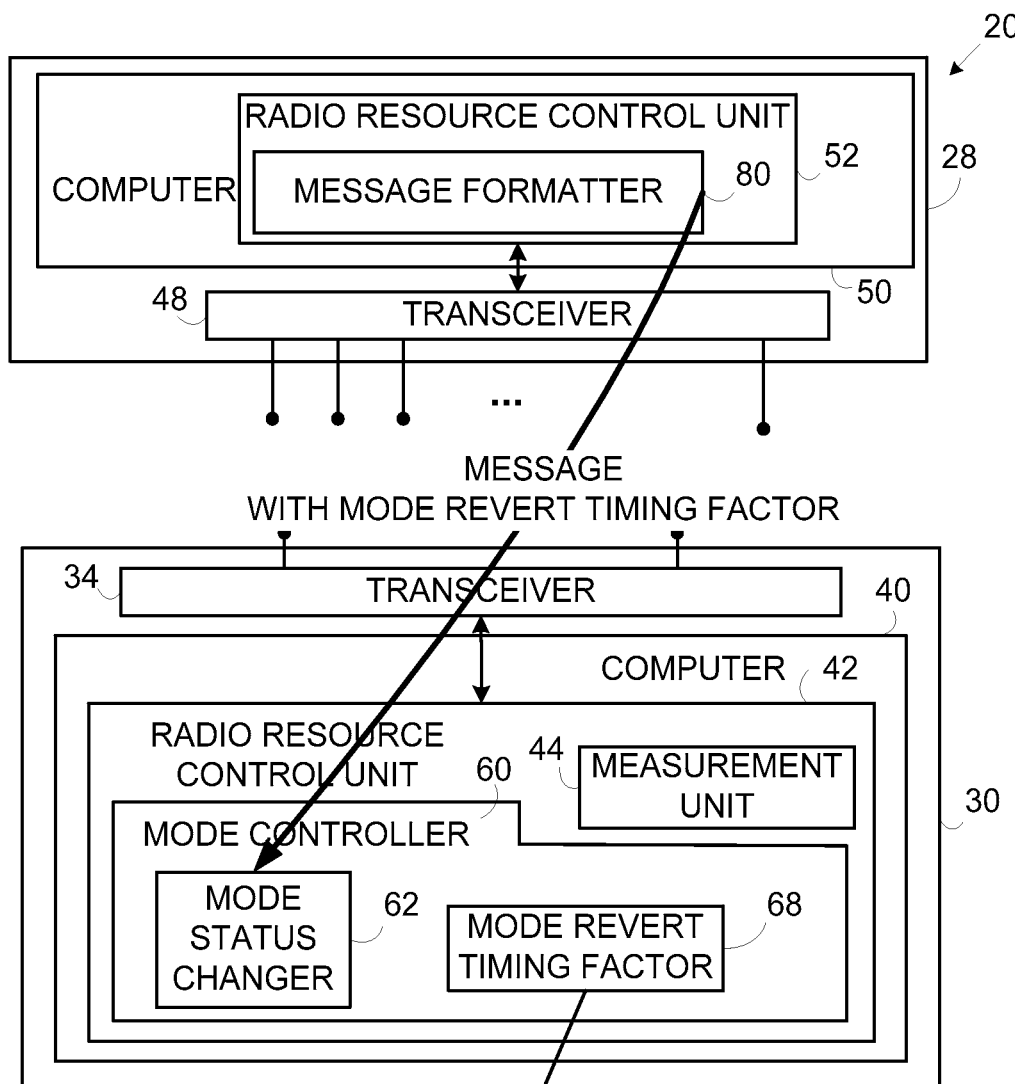
FIG. 9 is schematic diagram of a portion of a radio access network including a representative network node and a representative wireless terminal wherein, upon completion of the performance of the measurements, the wireless terminal reverts back to a discontinuous mode from a modified mode in accordance with a post-measurement mode revert timing factor.
Figure 10:
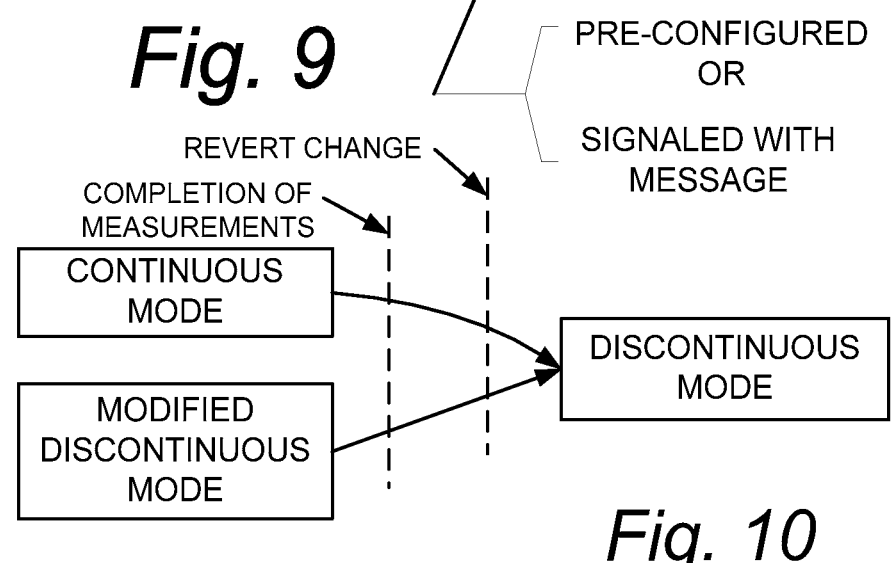
FIG. 10 is a diagrammatic view illustrating a timing sequence of the network of FIG. 9.

FIG. 9 and FIG. 10 illustrate an example embodiment of wireless terminal 30 wherein the radio resource control (RRC) unit 42 is configured, upon completion of the performance of the measurements, to revert back to the discontinuous mode from the modified mode in accordance with a post-measurement mode revert timing factor (MRTF) which influences timing of a reversion from the modified mode to the discontinuous mode. FIG. 10 superimposes a time vector on the illustration of the mode change from the discontinuous mode to the modified mode, and shows a relative time positioning of completion of the performance of the measurements and the subsequent mode reversion back to the discontinuous mode. Whereas in the previous embodiments the mode reversion occurs as soon as practicable upon completion of the performance of the measurements, in the FIG. 9 and FIG. 10 embodiment the mode revert timing factor (MRTF) essentially serves to delay the mode reversion past the point of practicable implementation. In some cases the mode revert timing factor (MRTF) can be an offset value (e.g., either a time duration or frame) which is required to occur after completion of the performance of the measurements before the mode reversion is to be implemented. In other cases, rather than being a relative offset value, the mode revert timing factor (MRTF) can be an indication of a particular (e.g., absolute) frame number of point in time at which the mode reversion is to occur (the mode revert timing factor (MRTF) in such cases pointing to a mode reversion event which is to occur after completion of the performance of the measurements.

FIG. 9 actually serves to illustrate two separate implementations, including a first implementation wherein the mode revert timing factor (MRTF) is pre-configured at the wireless terminal, e.g., pre-configured prior to reception of the message of act 2-1. To this end FIG. 9 shows radio resource control (RRC) unit 42 and its mode controller 60 as comprising mode revert timing factor (MRTF) register or memory location 72 wherein the pre-configured mode change timing factor (MCTF) can be stored. As mentioned, the pre-configuring can occur at any point prior to receipt of the message of act 2-1, e.g., at beginning of a session, through pre-session periodic update or administrative messages from the network, or upon initiation or power up of the wireless terminal 30.

FIG. 9 also shows another example implementation wherein a value for the mode revert timing factor (MRTF) is included in the message of act 2-1. This FIG. 9 alternate implementation shows the node radio resource control (RRC) unit 52 of network node 28 as including the previously mentioned message formatter 70. The message formatter 70 of FIG. 9 is configured to include the mode revert timing factor (MRTF) in the message of act 2-1. In an example implementation, the message can take the form of a (or be included in) any suitable RRC signaling message. The mode revert timing factor (MRTF) can be inserted in any unallocated field or any newly designated field of the measurement request message (MRM), such as a measurement configuration information element, for example.

FIG. 7 and FIG. 9 thus illustrate embodiments of network nodes wherein radio resource control (RRC) unit 52 is configured to prepare a message for transmission to wireless terminal 30, and to include therein a parameter which specifies or influences timing of a mode change. The mode change is between a discontinuous mode and a modified mode, e.g., in the case of FIG. 7 a mode change from a discontinuous mode to a modified mode and in the case of FIG. 9 a mode change from a modified mode to the discontinuous mode. In particular, the node radio resource control (RRC) unit 52 comprises message formatter 70 which is configured to include one or both of the mode change timing factor (MCTF) and the mode revert timing factor (MRTF) in the message of act 2-1. As mentioned previously, the discontinuous mode is configured to comprise at least one of non-reception periods between reception periods and non-transmission periods between transmission periods. Relative to the discontinuous mode the modified mode is configured to shortened or eliminated at least one of following: (i) the non-reception periods, and (ii) the non-transmission periods. The transceiver is configured to transmit the message of act 2-1 to the wireless terminal over the radio interface.

In an example embodiment the radio resource control (RRC) unit is configured to change from the discontinuous mode to the modified mode by disabling one or both of discontinuous reception (DRX) and discontinuous transmission (DTX).

In an example embodiment the measurement unit 44 of the wireless terminal 30 is configured to perform, e.g., measurements for determining position of the wireless terminal. There are diverse ways in which such measurements can be performed and evaluated. In one example implementation the message of act 2-1 is a measurement request message which is configured to direct the measurement unit 44 to measure time difference of arrival of the signals received by the wireless terminal from plural cells of the radio access network. In another example implementation the measurement request message is configured to direct the measurement unit 44 to measure reference signal time difference (RSTD) of signals received by the wireless terminal from plural cells of the radio access network.

It has been mentioned above that the message of act 2-1 can, in example embodiments, indicate that measurements are to be performed to determine position of the wireless terminal. The technology disclosed herein encompasses essentially any and all practicable ways of making such measurements and the various differing types of signals that facilitate the determination of position of the wireless terminal. Some non-limiting examples of positioning methods are mentioned below for sake of illustration.

One technique for determination of position of a wireless terminal comprises a determination of round trip time (RTT). The round trip time (RTT) is the time difference between the beginning of signal transmission in the downlink and estimated first path of the corresponding signal received in the uplink. The round trip time is measured at the base station. According to an example embodiment described subsequently with reference to FIG. 13 and FIG. 14, if the wireless terminal (UE) is in the discontinuous transmission (DTX) mode when the base station performs a determination of round trip time (RTT), the wireless terminal (UE) should disregard the discontinuous transmission (DTX) and instead should continuously transmit on the uplink in response to any received downlink signal from the base station, thereby speeding up the round trip time (RTT) measurement. It is a user specific measurement; this means it is measured separately for each UE in a cell. In the UTRAN system RTT is specified as a UTRAN measurement.

Another technique for determination of position of a wireless terminal comprises a determination of wireless terminal (UE) receive-transmit time difference (e.g., UE Rx-Tx time difference). In UTRAN FDD (WCDMA) there are two UE Rx-Tx time difference measurements: Type 1 and Type 2, which are primarily defined for call set up and positioning respectively. See, e.g., 3GPP TS 25.215, "Physical layer; Measurements (FDD)". Of these, the first one (Type 1) is mandatory, but has worse accuracy (±1.5 chip accuracy) than the second one (±1 chip accuracy), which is an optional measurement.

Another technique for determination of position of a wireless terminal comprises a determination of the observed time difference of arrival (OTDOA) of signals from three cells. In WCDMA the SFN-SFN type 2 measurements (See, e.g., 3GPP TS 25.215, "Physical layer; Measurements (FDD)", which is measured by the UE on CPICH signals received from two different cells, is used for determining UE positioning using this method. In E-UTRAN a similar measurement is done on a known pilot or reference signals. The reference signals can be normal cell specific reference signals or specific reference signals meant for positioning. In general such a measurement can be called as OTDOA. More specifically we call this measurement as reference signal time difference (RSTD).

Another technique for determination of position of a wireless terminal comprises normal neighbor cell measurements such as the received signal strength, received signal quality, and path loss. These types measurements can be used the pattern matching method, which is more commonly known as the fingerprinting method. The well known examples of such measurements are CPICH RSCP and CPICH Ec/No in UTRAN FDD [see, e.g., 3GPP TS 25.215, "Physical layer; Measurements (FDD)"], P-CCPCH RSCP in UTRAN TDD [see, e.g., 3GPP TS 25.225, "Physical layer; Measurements (TDD)"] and RSRP and RSRQ in E-UTRAN [see, e.g., 3GPP TS 36.214, "Evolved Universal Terrestrial Radio Access (E UTRA); Physical layer measurements"]. However, signal strength type measurements such as path loss, CPICH RSCP, P-CCPCH RSCP and RSRP are most relevant for pattern matching positioning methods.

Thus, the technology disclosed herein encompasses definition of a set of rules which govern behavior of the wireless terminal (UE) in DRX/DTX modes when it is requested by the network to perform one or more of the positioning measurements e.g. observed time difference of arrival of signals from two cells, reference signal time difference (RSTD), SFN-SFN type 2 measurement in UTRAN or any other measurement used for positioning. The technology disclosed herein encompasses, as either separate or combinable features, e.g., methods and apparatus for performing positioning measurements in discontinuous reception (DRX) as well as methods and apparatus for performing positioning measurements in discontinuous transmission (DTX).

In some embodiments encompassed hereby the network requests the wireless terminal (UE) to perform positioning measurements such as time difference of arrival of signals from two cells for two or more set of cells. These sets of cells should preferably be located in different base station sites. It is assumed that the wireless terminal (UE) is in a discontinuous mode (e.g., a DRX state) when such a request is received from the network. There are several facets of this part of the technology disclosed herein:

According to the first facet, upon receiving a request for measurement, the UE disregards the DRX cycle and goes into the continuous reception mode. The UE stays in the continuous reception mode until it has performed all the requested positioning measurements. After the completion of all the required measurements the wireless terminal (UE) returns or reverts to the discontinuous reception (DRX) state. Such a rule can be pre-defined in the standard so that the network is aware of the wireless terminal (UE) behavior in the discontinuous reception (DRX) mode.

According to a second facet, upon receiving the request for measurement the wireless terminal (UE) does not fully disregard the DRX cycle. Rather, the wireless terminal (UE) shortens its DRX cycle. The wireless terminal (UE) operates using shorter DRX cycle until it has performed all the requested positioning measurements. After the completion of all the required measurements the UE returns or reverts to the initial DRX, which was used prior to the reception of the measurement requests. Such a rule can also be pre-defined in the standard to make the network aware of the UE behavior in the DRX mode. The shorter DRX cycle can be pre-configured in the wireless terminal (UE) initially. Alternatively, it can also be a pre-defined DRX cycle such as the shortest possible DRX cycle or certain specific DRX cycle, e.g. 40 ms of periodicity. Alternatively the shorter DRX can be signaled in the same measurement control message, which contains request for performing the positioning measurements. In prior art systems (in E-UTRAN) the wireless terminal (UE) can be pre-configured with two DRX cycles e.g. one short and one long. This second facet is useful in case the wireless terminal (UE) is capable of meeting the required measurement accuracy with a shorter DRX cycle. In this way wireless terminal (UE) can still save its battery power to some extent.

As an example of the foregoing, assume the wireless terminal (UE) is using DRX cycle=1.28 seconds. Upon receipt of the positioning measurement request from the network node the wireless terminal (UE) starts operating using the DRX cycle=40 ms until it has completed all the measurements. After completion of the measurement, the UE returns to DRX cycle=1.28 seconds.

According to a third facet the time instance or any relative time offset when the UE goes into continuous mode or when it shortens its DRX cycle to perform positioning measurements can also be pre-defined. See the mode change timing factor (MCTF) mentioned above. Alternatively such parameter can be signaled to the wireless terminal (UE) along with the measurement request or it can be pre-configured initially at the wireless terminal (UE), e.g. at the start of the session.

Similarly according to a fourth facet the time instance or any relative time offset when the UE shall return or revert to the initial DRX cycle after perform positioning measurements can also be pre-defined. See the mode revert timing factor (MRTF) mentioned above. Alternatively it can also be signaled to the wireless terminal (UE) as a parameter along with the measurement request or it can be pre-configured with initially at the wireless terminal (UE) e.g. at the start of the session.

Overall the above facets correspond to the fact that the positioning measurements are of higher priority than the discontinuous mode, e.g., than the DRX. Thus according to a fifth facet, it can simply be specified by standard or otherwise that the positioning measurements are of higher priority than the DRX or that the wireless terminal (UE) is to override the DRX operation or ignore the DRX operation or shorten the DRX when performing the positioning measurements (e.g., when performing time difference of arrivals of signals from two cells). In this way the details of the methods in DRX shall be left for wireless terminal (UE) implementation without explicit standardization. Yet according to another embodiment it can also be specified that wireless terminal (UE) when in a discontinuous mode and requested to perform positioning measurements shall fulfill the measurement requirements corresponding to non-DRX case (continuous reception case) or those corresponding to shorter DRX. This means the measurement period and other requirements are the same as for the non DRX case or for the short DRX case.

As mentioned above, the wireless terminal (UE) can either disable the discontinuous mode (e.g., DRX) or it can shorten the DRX cycle upon the reception of the positioning measurement request. Some example, non-limiting, scenarios of the technology disclosed herein are illustrated in FIG. 11 and FIG. 12

Figure 11:
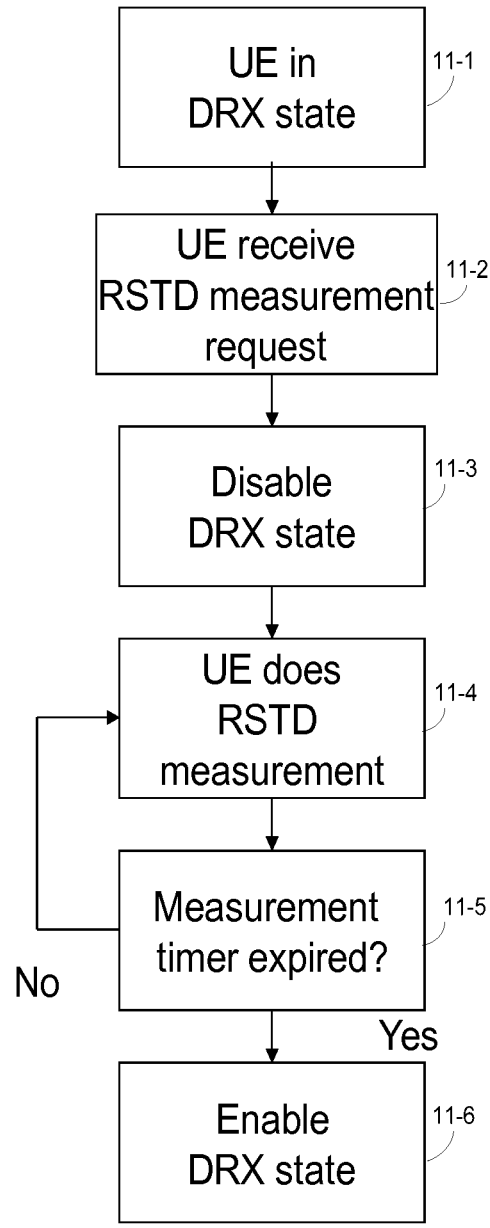
FIG. 11 is a flowcharting showing example acts or steps included in a non-limiting example method of a mode change operation which involves changing from a discontinuous mode to a continuous mode.

The scenario of FIG. 11 encompasses an example case wherein the DRX cycle is completely disabled by the UE (e.g., the first facet) upon receiving the request for performing the positioning measurement: e.g., RSTD. As shown in FIG. 11 initially the wireless terminal (UE) is in a DRX state (act 11-1). The wireless terminal (UE) then receives a RSTD measurement request (act 11-2) from the network. The request message from the network may also include the time instances (e.g. sub-frame or time offset, such as the mode change timing factor (MCTF) mentioned above) when the wireless terminal (UE) is to disable its DRX and when to enable the DRX after performing the measurement. Otherwise the wireless terminal (UE) determines the time instances or time offsets from the pre-defined values or rules. The wireless terminal (UE) then disables the DRX cycle (act 11-3) and starts performing RSTD measurement (act 11-4) from multiple set of paired cells e.g. N (N>1) set; serving cell and N neighbor cells. The wireless terminal (UE) is capable of performing all the requested RSTD measurements within the specified duration, e.g., according to the performance requirements. The duration over which the wireless terminal (UE) remains in non DRX (continuous reception mode) is therefore on the order of the RSTD measurement period for non DRX case. Therefore, when the measurement timer expires (11-5) the wireless terminal (UE) enables the DRX mode (act 11-6), e.g., reverts back to the discontinuous mode.

Figure 12:
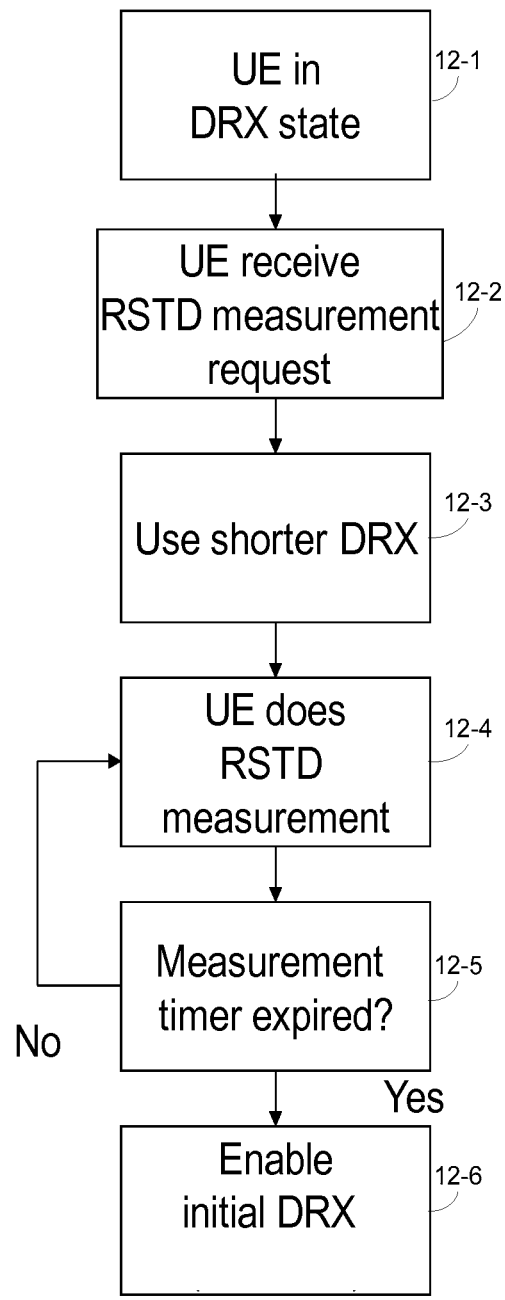
FIG. 12 is a flowcharting showing example acts or steps included in a non-limiting example method of a mode change operation which involves changing from a first discontinuous mode to a second discontinuous mode having a shortened cycle length.
Figure 15:
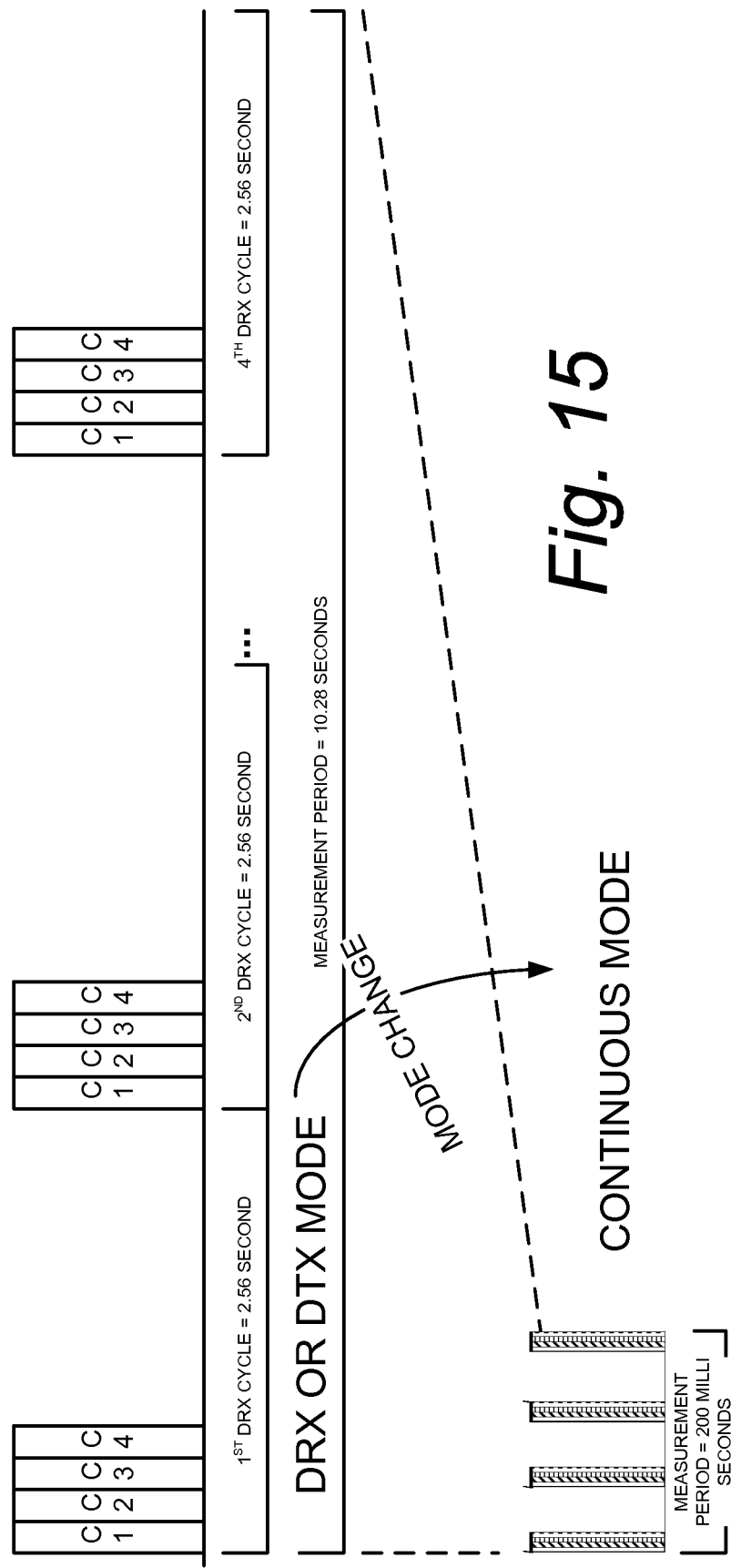
FIG. 15 is a diagrammatic view which contrasts an example measurement period of a discontinuous mode situation and an example measurement period of a non-discontinuous mode situation resulting from a mode change.

FIG. 12 illustrates an example, non-limiting specific scenario wherein the DRX cycle is shortened by the wireless terminal (UE) upon receiving the request for performing the positioning measurement, e.g., RSTD. As shown in FIG. 15, initially the wireless terminal (UE) is in a DRX state (act 12-1). The wireless terminal (UE) receives the RSTD measurement request (act 12-2) from the network. The request message from the network may also include the time instances (e.g. sub-frame or time offset) when the wireless terminal (UE) is to shorten its DRX cycle and when to return to the initial DRX state after performing the measurement. Otherwise the wireless terminal (UE) determines the time instances or time offsets from the pre-defined values or rules. The wireless terminal (UE) then shortens its DRX cycle (act 12-3) and starts performing RSTD measurement (act 12-4) from multiple set of paired cells e.g. N (N>1) set; serving cell and N neighbor cells. The duration over which the wireless terminal (UE) stays in the shorter DRX cycle is on the order of the RSTD measurement period corresponding to the shorter DRX cycle. Therefore when measurement timer expires (act 12-5) the wireless terminal (UE) returns to the initial DRX state (act 12-6).

Although the examples of FIG. 11 and FIG. 12 feature RSTD, a person skilled in the art can realize that the FIG. 11 and FIG. 12 examples can easily be applied to other positioning measurements such as UTRAN SFN-SFN type 2, observed time difference of arrival (OTDOA) of signals from two cells or any other positioning measurement including such as, path loss, signal strength and signal quality.

The discontinuous transmission (DTX) can occur due to any type of idle gaps. The gaps are generally used for performing measurements on inter-frequency carriers and/or inter-RAT carriers (i.e. on technologies other than the one corresponding to the serving carrier). In UTRAN and E-UTRAN the periodical compressed mode patterns and idle gaps respectively are used for performing these types of measurements.

The DTX is also used in UTRAN for other purposes such as to reduce transmission power, received interference, noise rise etc. For instance, in WCDMA, where traditionally continuous power control and hence a continuous DPCCH is used, the discontinuous uplink power control feature (i.e. by configuring a discontinuous dedicated physical control channel (DPCCH)), which is configurable by the network, allows the network to reduce uplink noise rise and UE transmission power. The exact DTX pattern e.g. periodicity and duration of the DTX/idle occasion/gap are set by the network according to the desired scenario.

According to a sixth facet of the technology disclosed herein the request for the positioning measurement (e.g. RSTD or SFN-SFN type 2 etc), the wireless terminal (UE) disables the DTX and goes into continuous transmission mode. After performing the positioning measurement the wireless terminal (UE) returns to the DTX mode. As in case of DRX the time instances or time offsets at which the DTX is disabled and enabled can be signaled by the network or can be derived from the pre-defined rule or can be pre-defined values.

According to a seventh facet of the technology disclosed herein upon receiving the request for the positioning measurement (e.g. RSTD or SFN-SFN type 2 etc), the wireless terminal (UE) does not completely disable the DTX, but rather reduces the DTX cycle or the level of the DTX, e.g. the UE may go from DTX periodicity of 640 ms to 80 ms.

The DTX cycle may also be pre-defined that upon the request. The wireless terminal (UE) goes to the shortest possible DTX level or alternatively the wireless terminal (UE) operates according to the pre-configured or pre-defined DTX/idle gap. After performing the positioning measurement the wireless terminal (UE) returns to the normal or to the initial DTX mode. As in case of DRX, the time instances or time offsets at which the wireless terminal (UE) transmits with shorter DTX and resumes with normal DRX can be signaled by the network or can be derived from the pre-defined rule or can be pre-defined values.

A longer DTX cycle or idle gaps (such as compressed mode gaps or measurement gaps) may particularly lead to longer measurement periods and response times of the positioning measurements done at the base station (e.g. round trip time or one way propagation delay). This is because due to the DTX or idle gaps the radio network node will sparsely receive the wireless terminal (UE) transmitted signals. This problem is solved, e.g., by the eighth facet of the technology disclosed herein.

Figure 13:
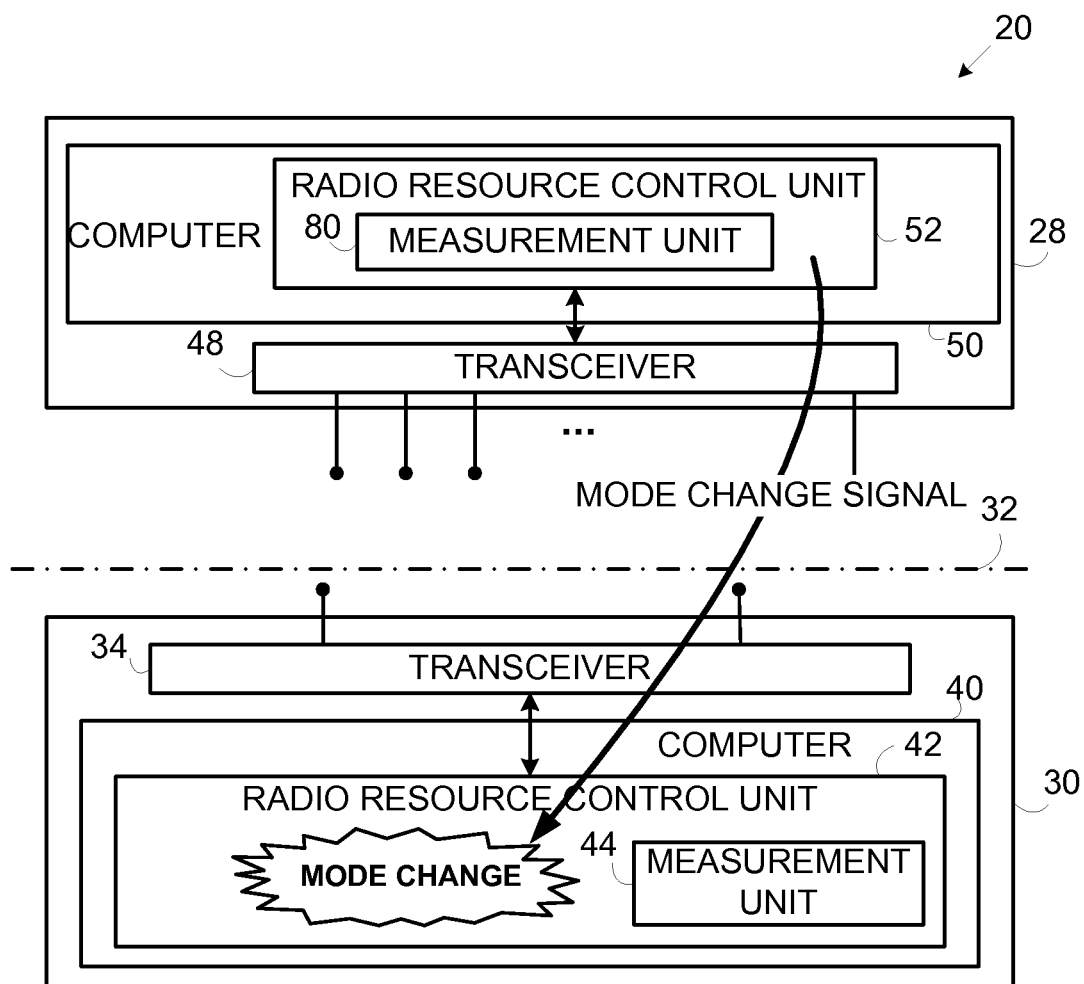
FIG. 13 is a schematic diagram of a portion of an example embodiment of a radio access network including a representative network node and a representative wireless terminal wherein the network node directs the wireless terminal to discontinue the discontinuous transmission (DTX) mode while the network node makes position measurements for the wireless terminal.

FIG. 13 shows a representative network node 28 and a representative wireless terminal 30 suitable for implementation the eighth facet of the technology disclosed herein wherein the network node 28 directs the wireless terminal 30 to discontinue the discontinuous transmission (DTX) mode while the network node makes position measurements for the wireless terminal. For this eighth facet the network node 28 of FIG. 13 includes node measurement unit 80.

Figure 14:
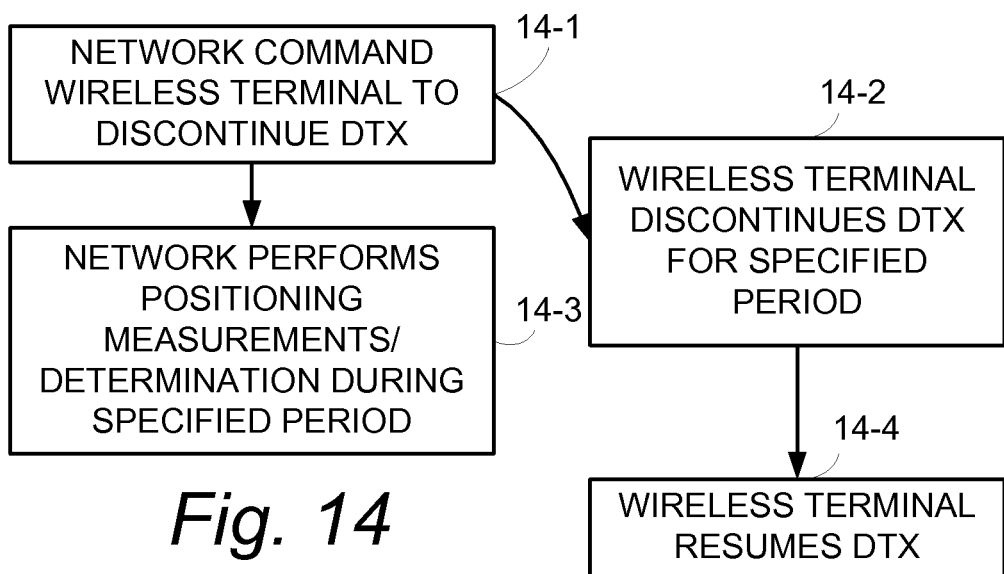
FIG. 14 is a flowcharting showing example acts or steps included in a non-limiting example method of a mode change operation for the embodiment of FIG. 13.

According to this eighth facet (illustrated in FIG. 13 and FIG. 14) the wireless terminal (UE) disables the DTX cycle to facilitate the uplink positioning measurement, e.g. round trip time or one way propagation delay etc. In this way the radio network node such as a base station, Node B or eNode B shall frequently receive the wireless terminal (UE)-transmitted signal and will be able to promptly perform the positioning related measurement and determined the UE position in a shorter duration. FIG. 14 shows example, non-limiting acts or steps for the eighth facet, and particularly shows as act 14-1 the network node signaling the wireless terminal (UE) a message or a command indicating the UE to disable the DTX over specified (e.g., certain) time period (T1). As act 14-2 the wireless terminal (UE) discontinues the discontinuous transmission (DTX) mode. During the certain or specified time period T1 the network node performs the positioning measurements (act 14-3). After the time period T1, the UE resumes the DTX operation (act 14-4).

In the eighth facet illustrated by FIG. 13 and FIG. 14 the time period T1 can be either specified by the network node in a message to the wireless terminal or a pre-defined value, e.g., the measurement period of the measurement quantity in the non DTX case. In that case the network signaled message shall simply indicate to the wireless terminal (UE) that the network shall perform the positioning measurement. Therefore UE shall ignore the DTX until a pre-defined time.

Thus, in the eighth facet the network indicates to the wireless terminal (UE) that the network is now performing measurement. So either network indicates UE to disregard DTX over certain time. Another way is that network simply sends pre-defined message or signal to UE. The pre-defined message implies according to pre-defined rule that UE is to disregard DTX over certain pre-defined time period.

Figure 16:
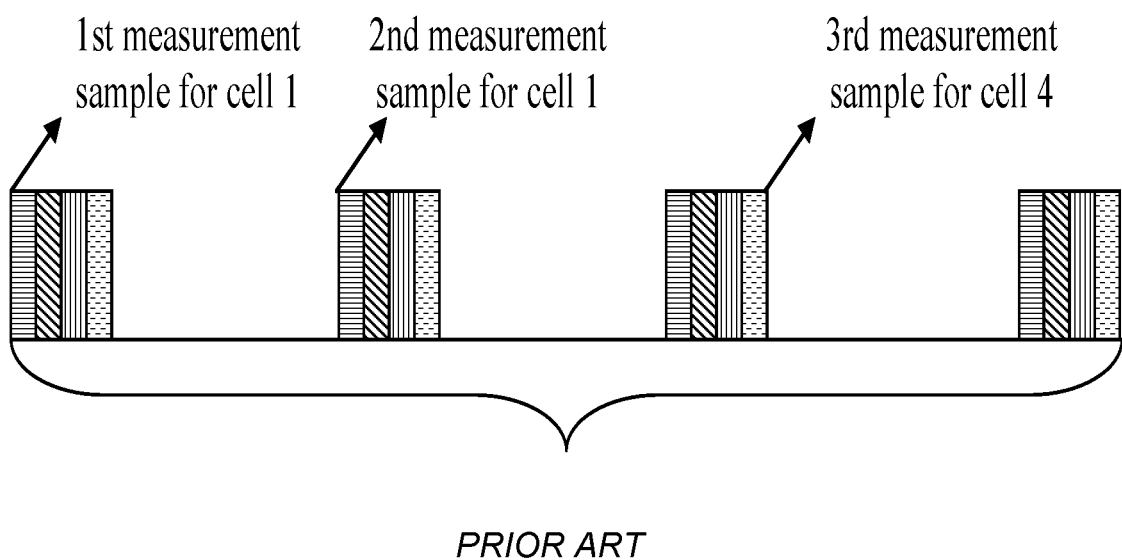
FIG. 16 is a diagrammatic view showing an example measurement period.

It has been mentioned several times above that a longer DRX cycle or a longer DTX cycle or idle gaps (such as compressed mode gaps or measurement gaps) may lead to longer measurement periods and thus delay the determination of the position of the wireless terminal (UE). FIG. 15 illustrates a situation in which the wireless terminal has been operating in a discontinuous mode (either one or both of DRX or DTX) having a cycle length of 2.56 second, with four samples of each of four cells. In the FIG. 15 discontinuous mode situation the measurement period of reference signal received power (RSRP), which is LTE measurement quantity, is approximately 10.28 seconds. FIG. 15 also shows the shortening of the measurement period that occurs upon a mode change to a modified mode such as a non-discontinuous mode, and particularly to the example situation of FIG. 16. Accordingly, FIG. 15 shows that, in view of the mode change, the measurement period has been reduced from 10.28 seconds to 200 milliseconds. The significantly shortened measurement period enables a more prompt and accurate determination of the position of the wireless terminal (UE).

The continuous transmission helps speed up measurements but also increases interference. Therefore a suitable value of DTX cycle or level of DTX would lead to reasonable measurement period of the positioning measurement and acceptable response time of the determined position of the wireless terminal (UE). This objective is achieved by the ninth facet of the technology disclosed herein. Thus according to this ninth facet the wireless terminal (UE) uses shorter DTX cycle/idle gaps to facilitate the radio network node performing the positioning measurement over a shorter period of time. As in the previous case, the network has to signal the UE when to shorten the DTX/idle gaps and over certain duration (T2). Either a shorter DTX cycle can be signaled to the UE or alternatively a pre-defined rule may also be specified. For instance the pre-define rule could require the UE to operate according to a shorter pre-configured or pre-defined DTX/idle gap; another possibility is that the wireless terminal (UE) uses the shortest possible DTX level. The duration (T2) can also be a pre-define value rather than a signaled value.

According to a tenth facet of the technology disclosed herein it can simply be specified or prescribed (e.g., standardized) that the positioning measurements are of higher priority than the DTX/idle gaps/measurement gaps/compressed mode gaps, otherwise specified that the UE is to override or ignore or shorten the DTX/idle gaps/measurement gaps/compressed mode gaps when the positioning measurements are performed either by the wireless terminal (UE) or by the network or both. In this way the details of the methods in DRX or idle gaps shall be left for wireless terminal (UE) implementation without explicit standardization. Yet according to another embodiment it can also be specified that when the wireless terminal (UE) is in DTX and positioning measurements are performed either by wireless terminal (UE) or by the radio network node the measurement requirements corresponding to non DTX case (continuous transmission case) or those corresponding to shorter DTX shall be met. This means the measurement period and other requirements are the same as for the non DTX case or for short DTX case.

In practice both DTX and DRX modes may be used. For instance when the wireless terminal (UE) is configured in DRX, the measurement gaps for performing the neighbor cell measurements may also be activated in parallel.

Hence according to an eleventh facet of the technology disclosed herein the wireless terminal (UE) disables both DRX and DTX (or any types of idle gaps) when the positioning related measurements (i.e. disables the DRX/DTX over the duration of measurements) are carried out either by the wireless terminal (UE) or by the radio network node such as a base station or by both wireless terminal (UE) and the radio network node.

According to a twelfth facet of the technology disclosed herein the UE uses both shorter DRX and shorter DTX when the positioning related measurements (i.e. uses shorter DRX/DTX over the duration of measurements) are carried out either by the UE or by the radio network node such as a base station or by both UE and the radio network node.

According to a thirteenth facet of the technology disclosed herein any combination of the methods related to the positioning measurements in DRX and DTX disclosed herein can be used.

All the preceding embodiments encompass and/or comprise the rules, methods, and procedures pertaining to the measurements related to the terrestrial positioning methods (e.g. UE based and network based UTDOA etc) in DRX.

In case of GNSS or A-GNSS the wireless terminal (UE) is required to fully or partially perform measurements on signals received from certain number of satellites, e.g. number of visible satellites, identity of satellites, etc. If the wireless terminal (UE) is in DRX mode the measurements shall be delayed. This in turn will lead to longer response time in the determination of the wireless terminal (UE) position.

According to the fourteenth facet of the technology disclosed herein all the methods described herein can also be used for performing satellite based positioning measurements, e.g. A-GPS measurements. This means the wireless terminal (UE) can either ignore DRX/DTX or can shorten the DRX/DTX when performing GNSS or A-GNSS or A-GPS related measurements.

The technology disclosed herein thus encompasses, among other things, the following, alternatively or collectively:

In the discontinuous reception (DRX) state the wireless terminal performs a reference signal time difference (RSTD) measurement over the measurement period corresponding to the non-discontinuous reception (DRX).

Regardless of whether the wireless terminal is in the discontinuous reception (DRX) mode/state or not, the wireless terminal performs the reference signal time difference (RSTD) measurement over the same measurement period.

If the wireless terminal is configured in the discontinuous reception (DRX) mode/state, then upon receiving the reference signal time difference (RSTD) measurement from the network, the wireless terminal ignores the discontinuous reception (DRX) cycle during the measurement period of the reference signal time difference (RSTD) measurement.

If the wireless terminal is configured in the discontinuous reception (DRX) mode/state, then upon receiving the reference signal time difference (RSTD) measurement request from the network the wireless terminal goes into a non-DRX state (or shortens its DRX cycle) during the measurement period of the reference signal time difference (RSTD).

According to the fifteenth facet of the technology disclosed herein the wireless terminal (UE) disregards DRX and/or DTX when there is critical situation such as emergency situation or public warning. The emergency or public warning may be caused due to one or several reasons such as: hurricane, typhoon, tornado, flood, acts of terrorism, fire etc. In one embodiment when UE is operating under DRX and/or DTX, then upon receiving any emergency related information from the network node, the UE disregards the DRX and/or DTX over certain time period (Te). The period Te can be a pre-defined period or it can be a value signaled by the network. The emergency information including Te can be sent to the UE via broadcast channel or via UE specific channel or via any suitable channel. The UE can either be explicitly indicated by the network via a signaling message to disregard the DRX and/or DTX states. Alternatively the disabling of the DRX and/or DTX states under emergency can also be based on a pre-defined rule. For instance a pre-defined rule can be specified according to which when UE initiates an emergency call or sends any request related to warning or emergency, then the UE disables the DRX and/or DTX over a pre-defined time or until the completion of the emergency call. After the public warning or emergency is over the UE reverts to the normal DRX and/or DTX operation. The disabling of DRX and/or DTX in emergency situation enables the UE and network to establish faster communication and also allows the UE and/or network node to perform faster measurements required for various reasons e.g. for determination of UE position, for better mobility performance etc.

According to sixteenth facet of the technology disclosed herein when UE is operating in DRX and/or DTX and if there is critical situation such as emergency or public warning, the UE does not completely disable the DRX and/or DTX states rather it shortens its DRX and/or DTX cycles over a time period (Ts); Ts can be a pre-defined value or a value signaled by the network node to the UE. The shorter values of DRX/DTX cycles can be pre-defined for use during the emergency situation or they can be signaled to the UE in emergency message via broadcast channel or via UE specific channel or via any suitable channel. After public warning or emergency is over the UE reverts to the normal DRX and/or DTX operation. The shortening of DRX and/or DTX in emergency situation has several advantages. It enables the UE and network to establish faster communication and allows the UE and/or network node to perform relatively faster measurements required for various reasons e.g. for determination of UE position, for better UE mobility performance etc. Another advantage is that UE can still save its battery power which is important in such emergency situation.

Figure 17:
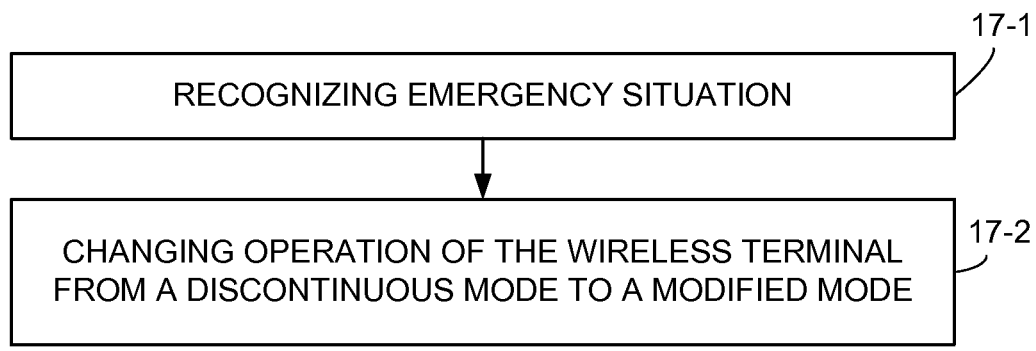
FIG. 17 is a flowchart showing basic, example acts or steps comprising another example embodiment of a method of operating a wireless terminal encountering an emergency situation.
Figure 18:
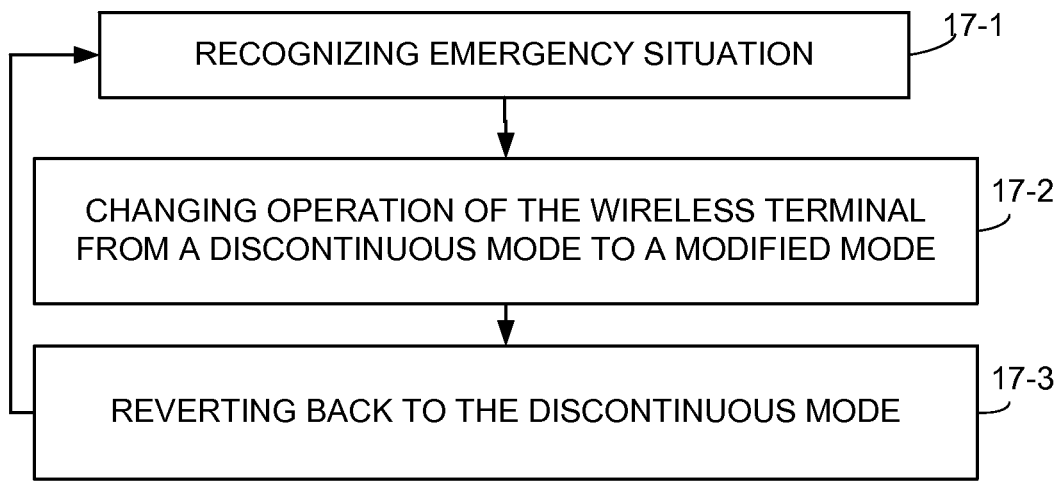
FIG. 18 is a flowchart showing basic, example acts or steps comprising an example embodiment of a method of operating a wireless terminal which includes an act of the wireless terminal reverting back from the modified mode to the discontinuous mode upon cessation of an emergency situation.

FIG. 17 and FIG. 18 illustrate the fifteenth and sixteenth facets of the technology disclosed herein. FIG. 17 shows example representative acts or steps involved in a method according to the fifteenth and sixteenth facets of the technology disclosed herein. Act 17-1 comprises recognizing that an emergency situation exists (the recognition being in accordance with any of the foregoing examples). The methods further comprise, as a result of or after the recognition, the act (act 17-2) of changing an operation mode of the wireless terminal 30, i.e., changing operation of the wireless terminal from a discontinuous mode to a modified mode to facilitate performance of the measurements. FIG. 18 illustrates a preferred version of the method of FIG. 17 which further includes as act 17-3 the wireless terminal 30 reverting back from the modified mode to the discontinuous mode. Such reverting can occur upon any of the example criteria described herein, e.g., upon expiration of a predetermine time interval or indication/realization that the emergency situation has terminated. In an example embodiment the changing operation of act 17-3 and/or the reverting act 17-3 can be accomplished by radio resource control (RRC unit 42. Aspects of the fifteenth and sixteenth facets of the technology, including but not limited to the meaning of discontinuous mode and modified mode and applicability to either or discontinuous reception (DRX) and discontinuous transmission (DTX), are understood with reference to other embodiments and examples described herein.

The technology disclosed herein encompasses for affords many advantages. Example, non-limiting advantages include the following:

The wireless terminal (UE) in DRX state can perform and report the measurements to be used for determining its positioning in a shorter duration. This, in turn, reduces the response time to determine the wireless terminal (UE) position when the wireless terminal (UE) is in DRX state.

By the virtue of the embodiment which allows the use of shorter DRX/DTX cycle, the measurement period and response times are reasonably reduced.

Reasonable interference and noise rise levels can be maintained by using shorter and appropriate DTX/gaps.

Reasonable UE power saving can be achieved by using shorter and appropriate DRX cycle.

The requirements of the emergence calls, which require fast determination of the UE position, can be met when the wireless terminal (UE) is in DRX.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be unduly limited. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly encompassed herein. Moreover, it is not necessary for a device or method to address each and every problem sought to be solved by the present invention, for it to be encompassed hereby.

What is claimed is:

1. A method of operating a wireless terminal in communication with a radio access network over a radio interface comprising:
    while the wireless terminal is in a discontinuous reception (DRX) mode comprising idle periods, receiving a message from the radio access network indicating that measurements are to be performed by the wireless terminal on position reference signals transmitted from one or more cells of the radio access network; and
    in response to receiving the message, shortening or eliminating at least one idle period of the DRX mode.

2. The method of claim 1, wherein receiving a message indicating that measurements are to be performed comprises receiving a message indicating that detection of cell identity is to be performed.

3. The method of claim 1, further comprising using the position reference signals to determine position of the wireless terminal.

4. The method of claim 1, wherein the measurements comprise measuring the observed time difference of arrival of the position reference signals from different cells.

5. The method of claim 1, wherein the position reference signals are specific reference signals meant for positioning determination.

6. The method of claim 1, further comprising reverting back to the DRX mode upon completion of the performance of the measurements.

7. The method of claim 1, wherein the message indicates that measurements are to be performed by the wireless terminal on the position reference signals transmitted from one or more cells of the radio access network.

8. The method of claim 1, wherein shortening or eliminating the at least one idle period of the DRX mode is performed prior to performance of the measurements.

9. A wireless terminal comprising:
    at least one processor;
    at least one memory including instructions which, when executed by the processor, cause the wireless terminal to:
        receive a message from the radio access network indicating that measurements are to be performed by the wireless terminal on position reference signals transmitted from one or more cells of the radio access network and
        in response to receiving the message, shortening or eliminating at least one idle period of a discontinuous reception (DRX) mode.

10. The wireless terminal of claim 9, wherein receiving a message indicating that measurements are to be performed comprises receiving a message indicating that detection of cell identity is to be performed.

11. The wireless terminal of claim 9, wherein the measurements are for determining position of the wireless terminal.

12. The wireless terminal of claim 9, wherein the measurements comprise measuring the observed time difference of arrival of the position reference signals from different cells.

13. The wireless terminal of claim 9, wherein the position reference signals are specific reference signals meant for positioning determination.

14. The wireless terminal of claim 9, wherein the memory further includes instructions which, when executed by the processor, cause the wireless terminal to revert back to the DRX mode upon completion of the performance of the measurements.

15. The wireless terminal of claim 9, wherein the message indicates that measurements are to be performed by the wireless terminal on the position reference signals transmitted from one or more cells of the radio access network.

16. The wireless terminal of claim 9, wherein shortening or eliminating the at least one idle period of the DRX mode is performed prior to performance of the measurements.

* * * * *